United States Patent
Boudreau

(10) Patent No.: US 11,105,406 B2
(45) Date of Patent: Aug. 31, 2021

(54) DIFFERENTIAL LOCK ASSEMBLY

(71) Applicant: Warn Automotive, LLC, Milwaukie, OR (US)

(72) Inventor: Christopher James Boudreau, Estacada, OR (US)

(73) Assignee: WARN Automotive, LLC, Milwaukie, OR (US)

( * ) Notice: Subject to any disclaimer, the term of this patent is extended or adjusted under 35 U.S.C. 154(b) by 81 days.

(21) Appl. No.: 16/280,853

(22) Filed: Feb. 20, 2019

(65) Prior Publication Data

US 2019/0257400 A1     Aug. 22, 2019

Related U.S. Application Data

(60) Provisional application No. 62/633,558, filed on Feb. 21, 2018.

(51) Int. Cl.
| | | |
|---|---|---|
| *F16H 48/22* | (2006.01) | |
| *B60L 50/60* | (2019.01) | |
| *F16D 28/00* | (2006.01) | |
| *B60L 53/14* | (2019.01) | |
| *F16H 48/24* | (2006.01) | |

(52) U.S. Cl.
CPC ............. *F16H 48/22* (2013.01); *B60L 50/60* (2019.02); *B60L 53/14* (2019.02); *F16D 28/00* (2013.01); *F16H 48/24* (2013.01)

(58) Field of Classification Search
CPC .......... F16H 48/22; F16H 48/24; F16H 48/34; F16H 2048/204; F16H 2048/207; F16H 2048/343; B60L 50/60; B60L 53/14; F16D 28/00; F16D 11/10; F16D 2011/002; F16D 23/12; F16D 2023/123; F16D 2125/582
See application file for complete search history.

(56) References Cited

U.S. PATENT DOCUMENTS

| | | | |
|---|---|---|---|
| 3,899,939 A | | 8/1975 | Hilado |
| 4,805,472 A | * | 2/1989 | Aoki ..................... B60K 23/08 180/247 |
| 4,916,973 A | * | 4/1990 | Fuelberth ........... B60K 17/3465 475/53 |

(Continued)

FOREIGN PATENT DOCUMENTS

| | | |
|---|---|---|
| EP | 1504974 A1 | 2/2005 |
| JP | 5130191 B2 | 11/2012 |

OTHER PUBLICATIONS

Feusse, C. et al. "Hydraulic Disconnect System and Operation Methods," U.S. Appl. No. 61/981,658, filed Apr. 18, 2014, 61 pages.

(Continued)

*Primary Examiner* — David R Morris
*Assistant Examiner* — Lori Wu
(74) *Attorney, Agent, or Firm* — Fish & Richardson P.C.

(57) ABSTRACT

Methods and systems are provided for a differential lock assembly for a motorized vehicle. In one example, the differential lock assembly includes a cam gear driven by an electric motor via a transmission of the assembly. The cam gear presses a biasing member against a clutch ring in order to couple a first axle half shaft of the vehicle to a carrier of a differential, and to rotate the first axle half shaft at a same speed as a second axle half shaft driven by the differential.

19 Claims, 13 Drawing Sheets

(56) References Cited

U.S. PATENT DOCUMENTS

| | | | |
|---|---|---|---|
| 6,561,939 B1* | 5/2003 | Knapke | F16D 28/00 |
| | | | 192/84.6 |
| 6,631,320 B1* | 10/2003 | Holt | B60T 8/175 |
| | | | 180/197 |
| 8,380,417 B2 | 2/2013 | Kaster | |
| 9,656,548 B2 | 5/2017 | Averill et al. | |
| 9,915,298 B2 | 3/2018 | Heravi et al. | |
| 10,144,284 B2 | 12/2018 | Christensen et al. | |
| 2003/0184171 A1 | 10/2003 | Teraoka et al. | |
| 2014/0179483 A1 | 6/2014 | Kahl | |
| 2016/0272177 A1 | 9/2016 | Korson et al. | |
| 2017/0144540 A1* | 5/2017 | Kincaid | B60K 23/08 |
| 2017/0234428 A1 | 8/2017 | Spooner et al. | |

OTHER PUBLICATIONS

Feusse, C. et al., "Hydraulic Disconnect System and Operation Methods," U.S. Appl. No. 62/051,851, filed Sep. 17, 2014, 70 pages.
ISA Korean Intellectual Property Office, International Search Report and Written Opinion Issued in Application No. PCT/US2019/018975, dated Jun. 18, 2019, WIPO, 13 pages.

* cited by examiner

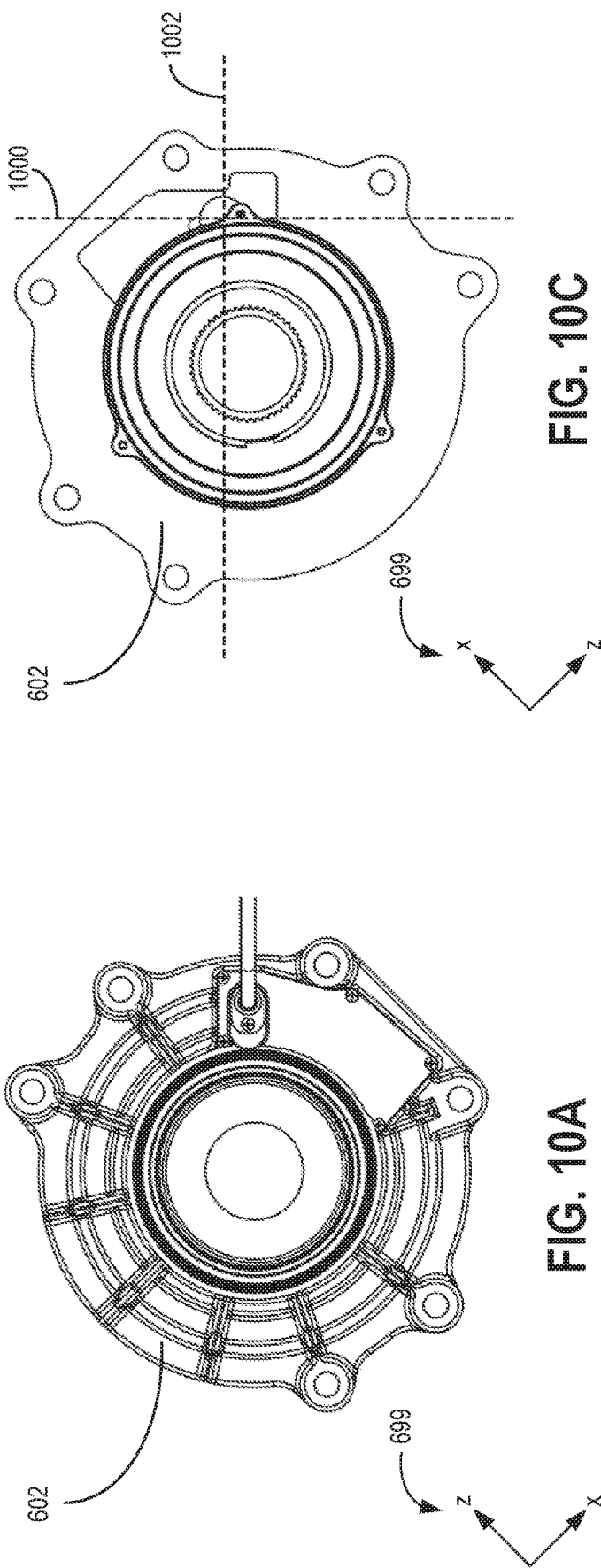
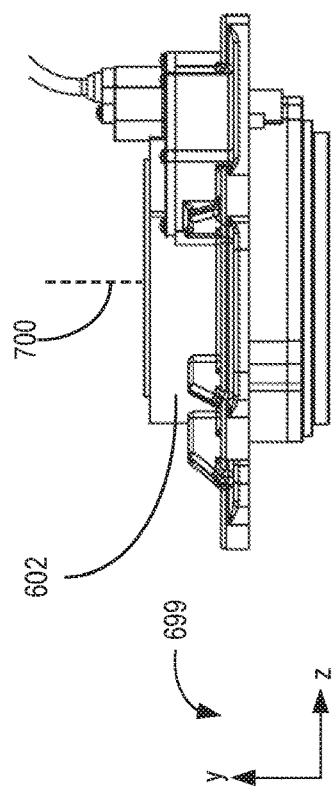
FIG. 10A
FIG. 10B
FIG. 10C

DIFFERENTIAL LOCK ASSEMBLY

CROSS REFERENCE TO RELATED APPLICATIONS

The present application claims priority to U.S. Provisional Application No. 62/633,558, entitled "DIFFERENTIAL LOCK ASSEMBLY", and filed on Feb. 21, 2018. The entire contents of the above-listed application are hereby incorporated by reference for all purposes.

FIELD

The present description relates generally to methods and systems for a differential lock assembly for a motorized vehicle.

BACKGROUND AND SUMMARY

Motorized vehicles often includes a differential for distributing torque to wheels of the vehicle. During conditions in which the vehicle is cornering, for example, the differential enables the wheels of the vehicle to rotate at different speeds in order to reduce a likelihood of wheel skidding or wheel degradation. During some conditions, such as rain or icy weather, an amount of traction between one or more wheels of the vehicle and a ground surface may be reduced relative to each other wheel. As a result, due to the distribution of torque to the wheels of the vehicle via the differential, one or more of the wheels may slip, and the wheels of the vehicle may be unable to propel the vehicle.

Attempts to address wheel slippage due to distribution of torque to engine wheels via the differential include providing differentials able to lock a rotation of one wheel relative to another. One example approach is shown by Hilado in U.S. Pat. No. 3,899,939. Therein, a self-locking differential employing helical gears is disclosed. The differential includes two abutting central helical gears disposed inside a differential carrier. The helical gears are connected to axle shafts on both sides of the vehicle by means of fluted or splined sleeves.

However, the inventors herein have recognized potential issues with such systems. As one example, such systems may not be able to adjust between locking and unlocking in response to a request by an operator of the vehicle. Additionally, such systems may not include mechanisms for deactivating the locking of the differential during conditions in which locking the differential may be undesirable.

In one example, the issues described above may be addressed by a differential lock assembly, comprising: a cam gear configured to engage with a biasing member of the differential lock assembly; and a clutch ring driven by the biasing member, the clutch ring adapted to couple in meshing engagement with a first coupler of a differential carrier and a second coupler of an axle half shaft. In this way, the clutch ring may be pressed into engagement with the first coupler and second coupler via the biasing member and cam gear to lock a rotation of the axle half shaft to the differential carrier.

As one example, the differential lock assembly includes a control module and a sensor configured to measure a position of the cam gear. The measured position of the cam gear indicates whether the differential lock assembly is in a locked condition, unlocked position, or transitional condition between the locked condition and unlocked condition. The control module may receive signals from an electronic controller of a vehicle in order to adjust the differential lock assembly to the locked condition via energization of an electric motor of the differential lock assembly. In this way, the differential lock assembly may be locked and/or unlocked in response to operator input and/or vehicle operating conditions, and vehicle handling may be increased.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 10A-10C show different views of the differential lock assembly of FIGS. 6-9 removed from the differential.

FIG. 4 and FIGS. 6-13 are shown to scale, though other relative dimensions may be used, if desired.

DETAILED DESCRIPTION

Figure 1:
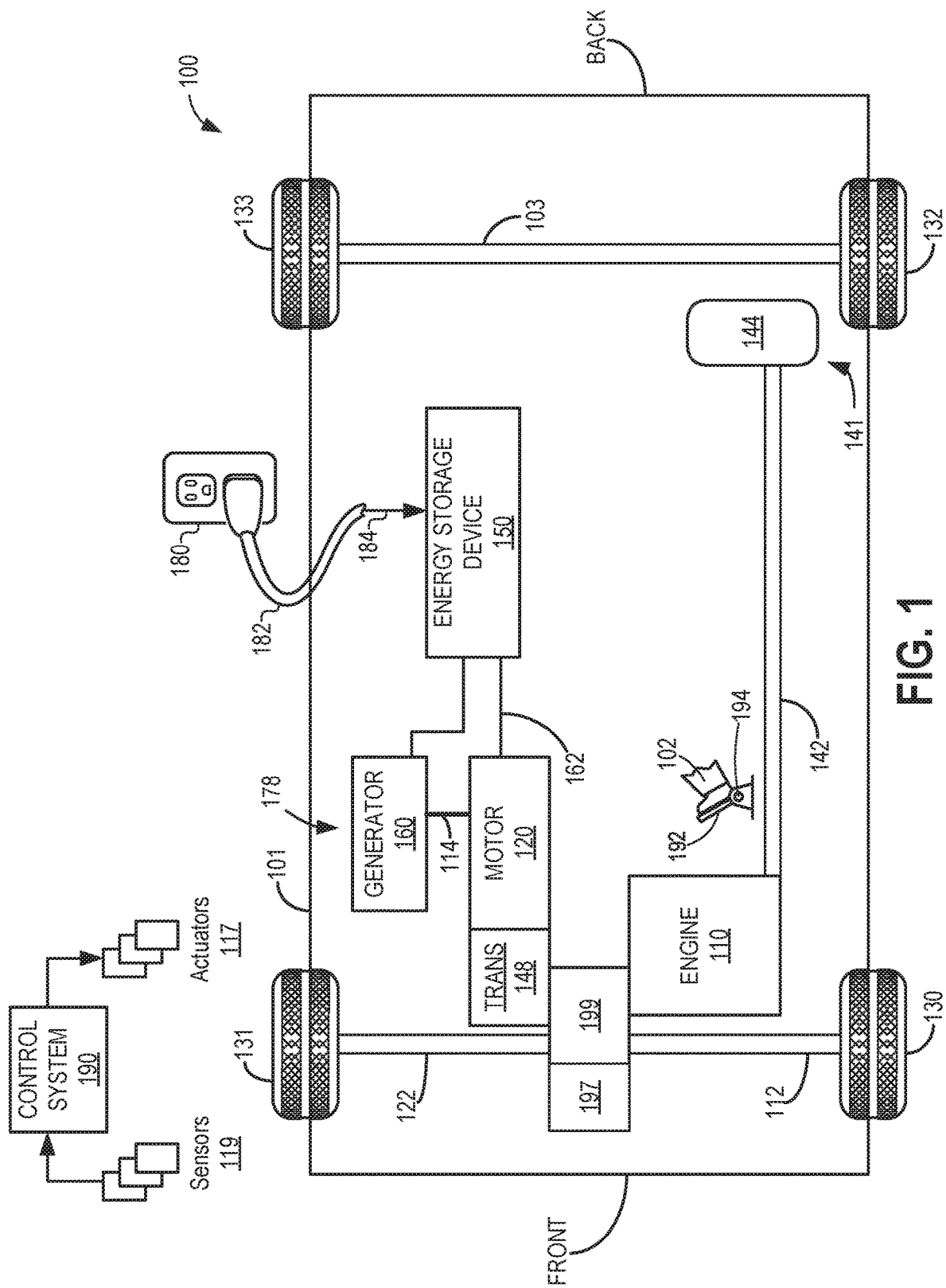
FIG. 1 schematically depicts a vehicle including a differential having a differential lock assembly.

The following description relates to systems and methods for a differential lock assembly of a motorized vehicle. A vehicle, such as the vehicle shown by FIG. 1, may be driven by one or more of an internal combustion engine, such as the engine shown by FIG. 2, and/or an electric motor/generator. The vehicle includes a differential configured to apply torque to wheels of the vehicle via first and second axle half shafts coupling the differential to the wheels, with the differential being powered by the engine and/or electric motor/generator via a transmission. The differential includes a differential lock assembly, such as the differential lock assembly shown by FIG. 4, FIGS. 6-11B, or FIGS. 12-13, configured to selectably lock a rotation of each of the half shafts relative to each other. During conditions in which the differential lock assembly is in a locked condition, each of the half shafts are driven by the differential at a same speed. In one example, as illustrated in the method of FIG. 5, the differential lock assembly includes a motor configured to drive a transmission of the assembly, with the transmission of the assembly driving rotation of a cam gear of the assembly. The cam gear may engage with a biasing member, as illustrated by FIG. 3, in order to press a clutch ring against couplers of the differential lock assembly and the first half shaft, locking the rotation of the first half shaft with respect to the second half shaft. By locking the rotation of the first half shaft with respect to the second half shaft, the first half shaft and second half shaft are driven at a same speed, and vehicle traction may be increased.

During conditions in which vehicle traction is relatively low (e.g., while one or more wheels of the vehicle are positioned on a slick material, such as ice), rotating a plurality of wheels of the vehicle at approximately a same speed may increase vehicle traction. In order to provide the approximately equal wheel rotation speed, a differential lock assembly may be utilized to lock a rotation of one or more wheels of the vehicle with respect to each opposing wheel. The differential lock assembly may lock a differential of the vehicle in order to drive wheels positioned at opposite sides of the vehicle at an approximately equal speed.

An average rotational speed of each wheel coupled to the differential is approximately equal to a rotation speed of a drive shaft supplying torque to the differential. During conditions in which the differential lock assembly does not lock the differential (e.g., the differential lock assembly is unlocked), the differential distributes torque evenly to each wheel coupled to the differential via axle half shafts. The amount of torque provided by each wheel to propel the vehicle is based on the wheel having the lowest amount of traction (e.g., traction between the wheel and a ground surface on which the wheel sits). For example, the differential may be coupled to a first wheel and a second, opposing wheel via a first half shaft and a second half shaft, respectively. The first wheel may have a higher, first amount of traction with the ground surface on which the first wheel sits, and the second wheel may have a lower, second amount of traction with the ground surface on which the second wheel sits. The amount of torque provided by the first wheel to propel the vehicle is decreased due to the lower amount of traction between the second wheel and the ground surface, and both the first wheel and second wheel provide the same, decreased amount of torque.

In order to increase the amount of torque provided by each of the first wheel and second wheel to propel the vehicle, the differential lock assembly may be actuated (e.g., locked) in order to lock the rotation of the second wheel with respect to the first wheel (and vice versa). The differential lock assembly may be adjusted to lock the differential in response to a user input (e.g., by pressing a button positioned in a cabin of the vehicle) and/or may be adjusted in response to estimated and/or measured vehicle operating conditions by an electronic controller of the vehicle. A signal (e.g., electrical signal) may be transmitted to a control module of the differential lock assembly transition the differential lock assembly from the unlocked condition to the locked condition, and vice versa. The control module receives the signal, and in response, may energize an electric motor of the differential lock assembly. The electric motor drives a transmission of the differential lock assembly to reduce a rotation speed of a cam gear driven by the electric motor, and to increase an amount of torque applied to the cam gear. A sensor may detect a position of the cam gear and may transmit one or more signals to the controller to indicate whether the differential lock assembly is in the locked condition, unlocked condition, or a transitional condition between locked and unlocked. The sensor communicates with the controller after the position of the cam gear is adjusted to indicate to the controller that differential lock assembly is in the desired condition.

The differential lock assembly includes a brake configured to maintain the position of the cam gear until torque from the electric motor is applied via the transmission of the assembly. The brake may reduce a likelihood that the differential lock assembly may change from the locked condition to the unlocked condition (or vice versa) when not commanded. As the cam gear is rotated, the cam gear applies an axial force to a biasing member of the differential lock assembly. In some examples, the axial force may be applied to one or more washers via the biasing member. The one or more washers may reduce a rotational motion from the biasing member as the axial force is applied to the biasing member (e.g., lock the biasing member from rotating). The one or more washers may press against clutch ring as a result of the axial force, and as a result the clutch ring may slide between a first coupling gear and an opposing, second coupling gear. The first coupling gear is fixed (e.g., fixedly coupled) to a carrier of the differential lock assembly (e.g., differential carrier or casing), and the second coupling gear is fixed to one of the half shafts coupled to the differential.

During conditions in which the clutch ring is pressed toward the first coupling gear and second coupling gear by the one or more washers (e.g., conditions in which the differential lock assembly is transitioned from the unlocked condition to the locked condition), teeth of the clutch ring may interfere with teeth of the first coupling gear and/or second coupling gear. As a result, the clutch ring may be unable to slide between the first coupling gear and second coupling gear, and the biasing member is maintained in a compressed condition. However, as the half shaft including the second coupling gear rotates, teeth of the second coupling gear may align with the teeth of the clutch ring, and the clutch ring may be pressed into meshing engagement with the first coupling gear and the second coupling gear via the biasing member and one or more washers. This configuration enables the electric motor and cam gear of the assembly to complete a shift cycle (e.g., to transition the assembly from the unlocked condition to the locked condition) and to be adjusted to the desired condition with a reduced load on the electric motor. By locking the rotation of the half shaft to the rotation of the differential carrier, bevel gears disposed within the differential carrier may not drive the first wheel and second wheel of the vehicle at different speeds. As a result, during conditions in which the differential lock assembly is in the locked condition, the torque provided by each of the first wheel and second wheel is not reduced by the wheel having the smaller amount of traction with its respective ground surface.

In order to adjust the differential lock assembly from the locked condition to the unlocked condition, the controller may transmit signals to the control module of the assembly in order to energize the electric motor of the assembly to rotate the cam gear such that the cam gear does not provide the axial force against the biasing member. As a result, the biasing member may return to its original, uncompressed condition, and the clutch ring may slide outward from the first coupling gear and second coupling gear. As a result, the rotation of the half shaft is not locked to the rotation of the differential carrier, such that the first half shaft and second half shaft may rotate at different speeds relative to each other. In this way, the differential lock actuator may selectively lock and unlock the rotation of the first wheel and second wheel relative to each other, and vehicle handling may be increased.

FIG. 1 schematically depicts an example vehicle system 100 as shown from a top view. Vehicle system 100 includes a vehicle body 101 with a front end, labeled "FRONT", and a back end labeled "BACK." Vehicle system 100 may include a plurality of wheels. For example, as shown in FIG. 1, vehicle system 100 may include a first pair of wheels adjacent to the front end of the vehicle (e.g., first wheel 130 and second wheel 131) and a second pair of wheels adjacent the back end of the vehicle (e.g., third wheel 132 and fourth wheel 133).

Vehicle system 100 includes an internal combustion engine 110, and in some examples may include an electric drive motor 120. Electric drive motor 120 may be configured to utilize or consume a different energy source than engine 110. For example, engine 110 may consume a liquid fuel (e.g. gasoline) or a gaseous fuel (e.g. natural gas) to produce an engine output (e.g., torque output) while electric drive motor 120 may consume electrical energy to produce a motor output. As such, a vehicle with propulsion system such as that shown in FIG. 1 may be referred to as a hybrid electric vehicle (HEV). However, in other examples, the vehicle system 100 may not include the electric drive motor 120 and may instead be powered (e.g., driven) by engine 110.

Vehicle system 100 may operate in a variety of different modes in response to operator input and operating conditions. These modes may selectively activate, deactivate, or couple a propulsion system to the electric drive motor 120, generator 160, engine 110, or some combination thereof. For example, under select operating conditions, electric drive motor 120 may propel the vehicle via rotation of the first wheel 130 and second wheel 131 (e.g., via rotation of first half shaft 112 and second half shaft 122, respectively, as described further below) during conditions in which engine 110 is deactivated.

During some vehicle operating conditions, engine 110 may be set to a deactivated state (as described above) while electric drive motor 120 may be operated to charge energy storage device 150. For example, electric drive motor 120 may receive wheel torque from rotation of first wheel 130 and second wheel 131 where the generator may convert the kinetic energy of the vehicle to electrical energy for storage at energy storage device 150. This operation may be referred to as regenerative braking of the vehicle. In some examples, the electric drive motor 120 and generator 160 may be a single entity such as a motor that has generation properties in some embodiments. However, in other embodiments, generator 160 may instead receive wheel torque from one or more wheels (e.g., first wheel 130, second wheel 131, third wheel 132, and/or fourth wheel 133), where the generator may convert the kinetic energy of the vehicle to electrical energy for storage at energy storage device 150 as indicated by line 162.

During still further operating conditions, engine 110 may be operated by combusting fuel received from fuel system 141 via fuel passage 142. For example, engine 110 may be operated to propel the vehicle via first wheel 130 and second wheel 131 while electric drive motor 120 is deactivated. During other operating conditions, both engine 110 and electric drive motor 120 may each be operated to propel the vehicle via first wheel 130 and second wheel 131. A configuration where both the engine and the motor may selectively propel the vehicle may be referred to as a parallel type vehicle propulsion system. Note that in some embodiments, electric drive motor 120 may propel the vehicle via the first wheel 130 and second wheel 131, and engine 110 may propel the vehicle via third wheel 132 and fourth wheel 133. In other examples, the electric drive motor 120 may propel the vehicle via the third wheel 132 and fourth wheel 133, and the engine 110 may propel the vehicle via the first wheel 130 and the second wheel 131.

In other embodiments, the propulsion system of vehicle system 100 may be configured as a series type vehicle propulsion system, whereby the engine does not directly propel the drive wheels. Rather, engine 110 may be operated to power electric drive motor 120, which may in turn propel the vehicle via first wheel 130 and second wheel 131. For example, during select operating conditions, engine 110 may drive generator 160, which may in turn supply electrical energy to one or more of electric drive motor 120 as indicated by line 114 or energy storage device 150 as indicated by line 162.

As another example, engine 110 may be operated to drive electric drive motor 120 which may in turn provide a generator function to convert the engine output to electrical energy, where the electrical energy may be stored in energy storage device 150 for later use by the motor. Embodiments of energy storage device 150 may include one or more rechargeable batteries, fuel cells, and/or capacitors for example. In these examples, electrical energy may be temporarily converted to chemical or potential energy for storage. The vehicle propulsion system may be configured to transition between two or more of the operating modes described above in response to operating conditions.

In the example shown by FIG. 1, the vehicle system 100 is configured as a forward wheel drive (FWD) vehicle system, with the engine 110 and/or electric drive motor 120 supplying torque to transmission 148 in order to drive the first wheel 130 and second wheel 131 via first half shaft 112 (e.g., axle half shaft or drive axle) and second half shaft 122, respectively. First half shaft 112 and second half shaft 122 are each rotationally coupled to differential 199, with the transmission 148 supplying torque to the first half shaft 112 and second half shaft 122 via the differential 199. Third wheel 132 and fourth wheel 133 are each shown coupled to rear axle shaft 103 in order to support the vehicle system 100, but in this configuration, the third wheel 132 and fourth wheel 133 are not coupled to the transmission 148 or differential 199.

However, in another configuration, the vehicle system 100 may be configured as a rear wheel drive (RWD) vehicle system, with the engine 110 and/or electric drive motor 120 supplying torque to transmission 148, and with transmission 148 driving a drive shaft extending in a direction from the front of the vehicle to the back of the vehicle (e.g., a direction from the front end including first wheel 130 and second wheel 131, toward the back end including third wheel 132 and fourth wheel 133). Instead of being coupled to respective half shafts, first wheel 130 and second wheel 131 may be coupled to a single shaft extending between the first wheel 130 and second wheel 131. Additionally, instead of the third wheel 132 and fourth wheel 133 being coupled together via rear axle shaft 103, the third wheel 132 may be coupled to a first rear half shaft and the fourth wheel 133 may be coupled to a second rear half shaft. The first rear half shaft and second rear half shaft may each be coupled to differential 199, with differential 199 being positioned between each rear half shaft at the back of the vehicle system. A first end of the drive shaft may be coupled to the transmission 148, and a second end of the drive shaft may be coupled to the differential 199, such that the third wheel 132 and fourth wheel 133 are driven by the transmission 148 (which is driven by engine 110) via the drive shaft coupled to the differential 199. In this configuration, the first wheel 130 and second wheel 131 are not coupled to the transmission 148 or differential 199.

In yet another configuration, the vehicle system 100 may be configured as an all-wheel drive (AWD) vehicle system, with the engine 110 and/or electric drive motor 120 supplying torque to transmission 148, and with transmission 148 driving both of a first differential positioned at the front of the vehicle system and a second differential positioned at the back of the vehicle system. The first wheel 130 and second wheel 131 may each be coupled to the first differential via respective front axle half shafts, and the third wheel 132 and fourth wheel 133 may each be coupled to the second differential via respective rear axle half shafts. The transmission 148 may drive each of the differentials via one or more drive shafts. In this configuration, each wheel of the vehicle system 100 is driven by the transmission 148.

In each of the configurations described above (e.g., the FWD, RWD, and AWD configurations), each differential (e.g., differential 199) includes a differential lock assembly. For example, with respect to the FWD configuration shown by FIG. 1, the differential 199 includes differential lock assembly 197 configured to lock and/or unlock a rotation of first wheel 130 relative to the second wheel 131. Examples of differential lock assemblies similar to the differential lock assembly 197 are described further below with reference to FIG. 4, FIGS. 6-11B, and FIGS. 12-13.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc.

Fuel system 141 may include one or more fuel storage tanks 144 for storing fuel on-board the vehicle. For example, fuel tank 144 may store a condensed natural gas (CNG) fuel source, such as methane gas, or a liquid fuel source, such as gasoline or diesel. Other embodiments may have a first, gaseous fuel source stored in fuel tank 144 and a second, liquid fuel source stored in an additional tank. In such examples, the gaseous fuel source may be coupled to engine 110 and/or electric drive motor 120, and the liquid fuel source may be coupled to engine 110. Other embodiments may couple gaseous fuel source to electric drive motor 120 and not engine 110, with engine 110 being coupled to the liquid fuel source. In some examples, the fuel may be stored on-board the vehicle as a blend of two or more different fuels. A liquid fuel source may be configured to store a blend of gasoline and ethanol (e.g. E10, E85, etc.) or a blend of gasoline and methanol (e.g. M10, M85, etc.). A gaseous fuel source may be a blend of methane, hydrogen gas, oxygen gas, or carbon monoxide. Fuels or fuel blends may be delivered to engine 110 as indicated by fuel passage 142. Still other suitable fuels or fuel blends may be supplied to engine 110, where they may be combusted at the engine to produce an engine output. The engine output may be utilized to propel the vehicle or to recharge energy storage device 150 via electric drive motor 120 or generator 160. Note that in some examples the first gaseous fuel source may be coupled to a transmission or generator directly or via electric drive motor 120.

Control system 190 may communicate with one or more of engine 110, electric drive motor 120, fuel system 141, energy storage device 150, and generator 160. Control system 190 may be referred to herein as a controller or electronic controller. The control system 190 (e.g., controller) receives signals from the various sensors of FIG. 1 and employs the various actuators of FIG. 1 to adjust engine operation based on the received signals and instructions stored on a memory of the control system. For example, control system 190 may receive sensory feedback information from one or more of engine 110, electric drive motor 120, fuel system 141, energy storage device 150, transmission 148, and generator 160. Further, control system 190 may send control signals to one or more of engine 110, electric drive motor 120, fuel system 141, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal. In another example, adjusting a condition (e.g., mode) of differential 199 may include transmitting a signal (e.g., electrical signal) to the differential lock assembly 197 via the control system to adjust the differential lock assembly 197 between a locked condition and an unlocked condition.

Energy storage device 150 may periodically receive electrical energy from a power source 180 residing external to the vehicle (e.g. not part of the vehicle) as indicated by line 184. As a non-limiting example, the propulsion system of vehicle system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, electric drive motor 120 may propel the vehicle by utilizing an energy source other than the fuel utilized by engine 110.

Fuel system 141 may periodically receive fuel from a fuel source residing external to the vehicle. As a non-limiting example, the propulsion system of vehicle system 100 may be refueled by receiving fuel via a fuel dispensing device (e.g., a fuel nozzle) positioned externally relative to the vehicle. In some embodiments, fuel tank 144 may be configured to store the fuel received from fuel dispensing device until it is supplied to engine 110 for combustion. In some embodiments, control system 190 may receive an indication of the level of fuel stored at fuel tank 144 via a fuel level sensor. The level of fuel stored at fuel tank 144 (e.g. as identified by the fuel level sensor) may be communicated to the vehicle operator, for example, via a fuel gauge or indication lamp.

It should be understood that though FIG. 1 shows a plug-in hybrid electric vehicle, in other examples, vehicle system 100 may be a hybrid vehicle system without plug-in components. Further, in other examples, vehicle system 100 may not be a hybrid vehicle but may be another type of vehicle with other propulsion mechanisms, such as a vehicle with a gasoline engine or a CNG engine which may or may not include other propulsion systems.

Figure 2:
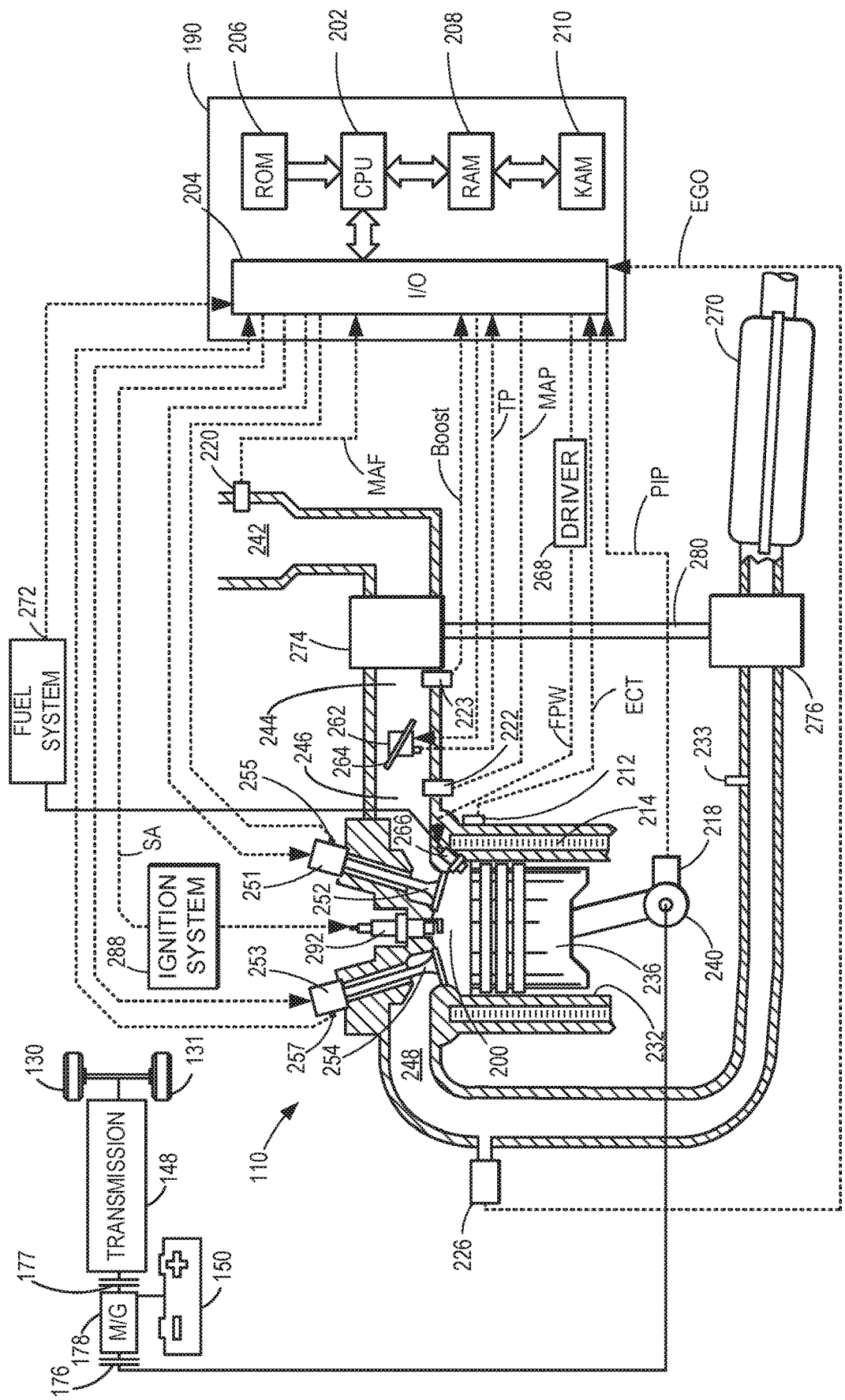
FIG. 2 schematically depicts an engine system of the vehicle of FIG. 1.
Figure 3:
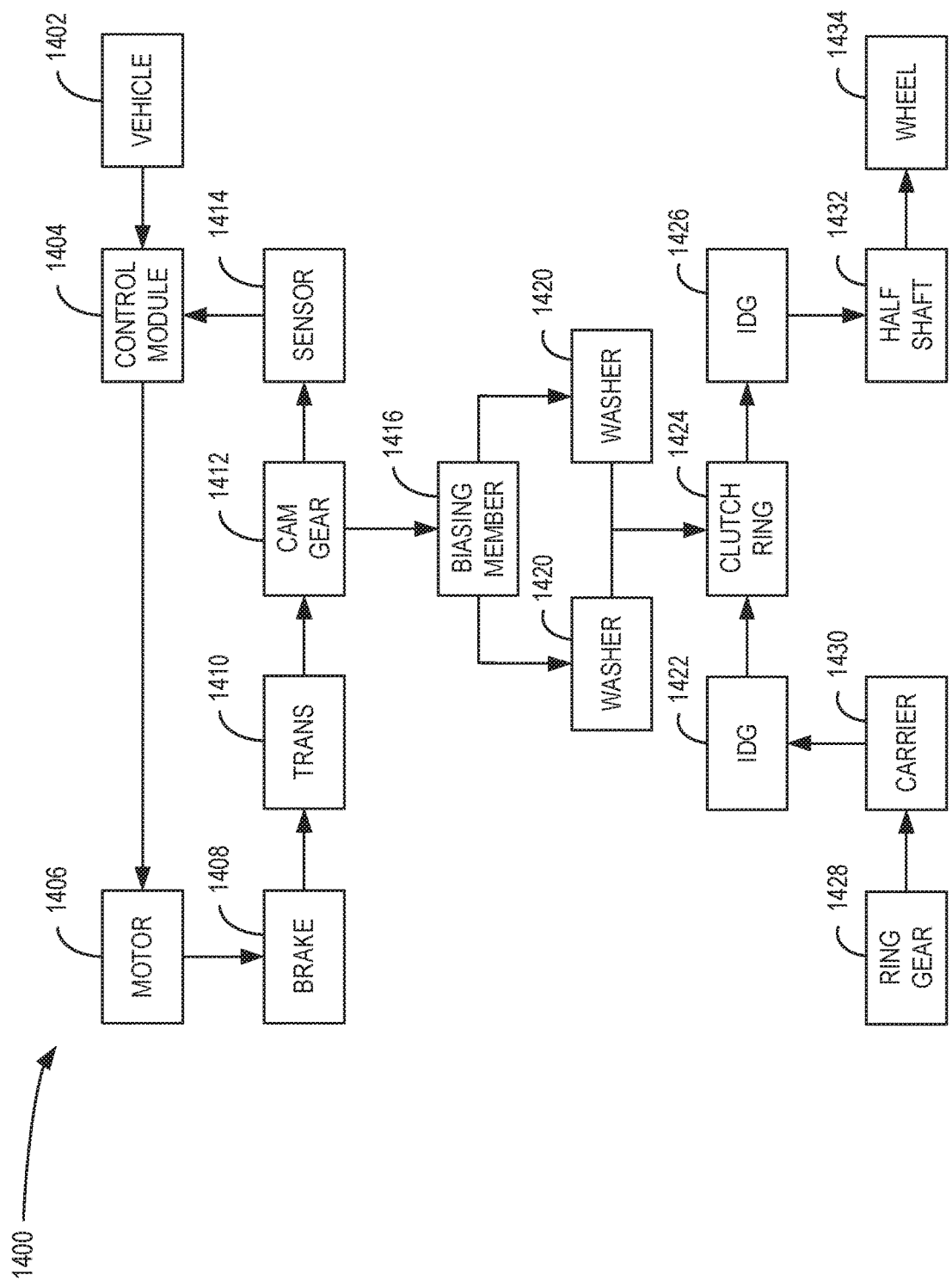
FIG. 3 shows a block diagram illustrating relative connections of a differential lock assembly.

FIG. 2 depicts an example embodiment of a cylinder 200 of engine 110. Note that cylinder 200 may correspond to one of a plurality of engine cylinders. Cylinder 200 is at least partially defined by combustion chamber walls 232 and piston 236. Piston 236 may be coupled to a crankshaft 240 via a connecting rod, along with other pistons of the engine. Crankshaft 240 may be operatively coupled with one or more wheels (e.g., first wheel 130, second wheel 131, third wheel 132, and/or fourth wheel 133), electric drive motor 120, or generator 160 via transmission 148.

Cylinder 200 may receive intake air via an intake passage 242. Intake passage 242 may also communicate with other cylinders of engine 110 as well as cylinder 200. In some embodiments, one or more of the intake passages may include a boosting device such as a turbocharger or a supercharger. For example, FIG. 2 shows engine 110 configured with a turbocharger including a compressor 274 arranged between intake passages 242 and 244, and an exhaust turbine 276 arranged along exhaust passage 248. Compressor 274 may be at least partially powered by exhaust turbine 276 via a shaft 280 where the boosting device is configured as a turbocharger. However, in other examples, such as where engine 110 is provided with a supercharger, exhaust turbine 276 may be optionally omitted, where compressor 274 may be powered by mechanical input from a motor or the engine. Intake passage 242 may include a throttle 262 including a throttle plate 264 that may be adjusted by control system 190 to vary the flow of intake air that is provided to the engine cylinders. For example, throttle 262 may be disposed downstream of compressor 274 as shown in FIG. 2, or may alternatively be provided upstream of compressor 274.

Cylinder 200 may communicate with intake passage 242 via one or more intake valves 252. Cylinder 200 may exhaust products of combustion via an exhaust passage 248. Cylinder 200 may communicate with exhaust passage 248 via one or more exhaust valves 254. Exhaust passage 248 may receive exhaust gases from other cylinders of engine 110 in addition to cylinder 200. Exhaust gas sensor 226 is shown coupled to exhaust passage 248 upstream of emission control device 270. Sensor 226 may be any suitable sensor for providing an indication of exhaust gas AFR such as a linear oxygen sensor or UEGO (universal or wide-range exhaust gas oxygen), a two-state oxygen sensor or EGO (as depicted), a HEGO (heated EGO), a NOx, HC, or CO sensor. Emission control device 270 may be a three way catalyst (TWC), NOx trap, various other emission control devices, or combinations thereof.

In some embodiments, cylinder 200 may optionally include a spark plug 292, which may be actuated by an ignition system 288. A fuel injector 266 may be provided in the cylinder to deliver fuel directly thereto. However, in other embodiments, the fuel injector may be arranged within intake passage 242 upstream of intake valve 252. Fuel injector 266 may be actuated by a driver 268.

In FIG. 2, fuel injector 266 is shown coupled directly to cylinder 200 for injecting fuel directly therein in proportion to the pulse width of signal FPW received from control system 190 via electronic driver 268. In this manner, fuel injector 266 provides what is known as direct injection (hereafter referred to as "DI") of fuel into combustion cylinder 200. As shown, injector 266 may be a side injector, it may also be located overhead of the piston, such as near the position of spark plug 292. Such a position may increase mixing and combustion when operating the engine with an alcohol-based fuel due to the lower volatility of some alcohol-based fuels. Alternatively, the injector may be located overhead and near the intake valve to increase mixing. Fuel may be delivered to fuel injector 266 from high pressure fuel system 272 including a fuel tank, fuel pumps, a fuel rail, and driver 268. Alternatively, fuel may be delivered by a single stage fuel pump at lower pressure, in which case the timing of the direct fuel injection may be more limited during the compression stroke than if a high pressure fuel system is used. Further, while not shown, the fuel tank may have a pressure transducer providing a signal to control system 190.

Fuel injector 266 may be arranged in intake passage 246, rather than in cylinder 200, in a configuration that provides what is known as port injection of fuel (hereafter referred to as "PFI") into the intake port upstream of cylinder 200.

Cylinder 200 may have a compression ratio, which is the ratio of volumes when piston 236 is at bottom center to top center. Conventionally, the compression ratio is in the range of 9:1 to 10:1. However, in some examples where different fuels are used, the compression ratio may be increased. This may happen for example when higher octane fuels or fuels with higher latent enthalpy of vaporization are used. The compression ratio may also be increased if direct injection is used due to its effect on engine knock.

A non-limiting example of control system 190 is depicted schematically in FIG. 2. Control system 190 may include a processing subsystem (CPU) 202, which may include one or more processors. CPU 202 may communicate with memory, including one or more of read-only memory (ROM) 206, random-access memory (RAM) 208, and keep-alive memory (KAM) 210. As a non-limiting example, this memory may store instructions that are executable by the processing subsystem. The process flows, functionality, and methods described herein may be represented as instructions stored at the memory of the control system that may be executed by the processing subsystem.

CPU 202 can communicate with various sensors and actuators (e.g., sensors 119 and actuators 117 shown by FIG. 1) of engine 110 via an input/output device 204. As a non-limiting example, these sensors may provide sensory feedback in the form of operating condition information to the control system, and may include: an indication of mass airflow (MAF) through intake passage 242 via sensor 220, an indication of manifold air pressure (MAP) via sensor 222, an indication of throttle position (TP) via throttle 262, an indication of engine coolant temperature (ECT) via sensor 212 which may communicate with coolant passage 214, an indication of engine speed (PIP) via sensor 218, an indication of exhaust gas oxygen content (EGO) via exhaust gas composition sensor 226, an indication of PCV exhaust gas moisture and hydrocarbon content via PCV exhaust line gas sensor 233, an indication of intake valve position via sensor 255, an indication of boost flow and/or boost pressure via sensor 223, and an indication of exhaust valve position via sensor 257, among others. For example, gas sensor 233 may be a humidity sensor, oxygen sensor, hydrocarbon sensor, and/or combinations thereof.

Intake valve 252 may be controlled by control system 190 via actuator 251. Similarly, exhaust valve 254 may be controlled by control system 190 via actuator 253. During some conditions, control system 190 may vary the signals provided to actuators 251 and 253 to control the opening and closing of the respective intake and exhaust valves. The position of intake valve 252 and exhaust valve 254 may be determined by respective valve position sensors (not shown). The valve actuators may be of the electric valve actuation type or cam gear actuation type, or a combination thereof. The intake and exhaust valve timing may be controlled concurrently or any of a possibility of variable intake cam gear timing, variable exhaust cam gear timing, dual independent variable cam gear timing or fixed cam gear timing may be used. Each cam gear actuation system may include one or more cam gears and may utilize one or more of cam gear profile switching (CPS), variable cam gear timing (VCT), and variable valve timing (VVT) and/or variable valve lift (VVL) systems that may be operated by control system 190 to vary valve operation. For example, cylinder 200 may alternatively include an intake valve controlled via electric valve actuation and an exhaust valve controlled via cam gear actuation including CPS and/or VCT. In other embodiments, the intake and exhaust valves may be controlled by a common valve actuator or actuation system, or a variable valve timing actuator or actuation system.

In some examples, as described above with reference to FIG. 1, vehicle system 100 including the engine 110 may be a hybrid vehicle system with multiple sources of torque available to one or more vehicle wheels (e.g., first wheel 130, second wheel 131, third wheel 132, and/or fourth wheel 133). In other examples, vehicle system 100 is a conventional vehicle with only an engine, or an electric vehicle with only electric machine(s). In the example shown by FIG. 1, vehicle system 100 includes engine 110 and electric motor/generator 178. Crankshaft 240 of engine 110 (shown by FIG. 2) and electric motor/generator 178 are connected via transmission 148 to vehicle wheels (e.g., first wheel 130, second wheel 131, third wheel 132, and/or fourth wheel 133) when one or more clutches are engaged. In the example depicted by FIG. 2, a first clutch 176 is provided between crankshaft 240 and electric motor/generator 178, and a second clutch 177 is provided between electric motor/generator 178 and transmission 148. Controller 190 may send a signal to an actuator of each clutch (e.g., first clutch 176 and/or second clutch 177) to engage or disengage one or more of the clutches, so as to connect or disconnect crankshaft 240 from electric motor/generator 178 and the components connected thereto, and/or connect or disconnect electric motor/generator 178 from transmission 148 and the components connected thereto. Transmission 148 may be a gearbox, a planetary gear system, or another type of transmission. The powertrain may be configured in various manners including as a parallel, a series, or a series-parallel hybrid vehicle.

Electric motor/generator 178 receives electrical power from energy storage device 150 to provide torque to the vehicle wheels. Electric motor/generator 178 may also be operated as a generator to provide electrical power to charge energy storage device 150, for example during a braking operation, as described above with reference to FIG. 1.

FIG. 3 shows a block diagram 1400 illustrating relative connections of a differential lock assembly (e.g., the differential lock assembly 197 described above, or the differential lock assemblies described below with reference to FIG. 4, FIGS. 6-11B, and/or FIGS. 12-13).

As shown by FIG. 3, the control module 1404 of the differential lock assembly (e.g., similar to control module 300 described below with reference to FIG. 4) may be in electronic communication with a controller of vehicle 1402 (e.g., controller 190 of vehicle system 100 described above). Further, control module 1404 may be in electronic communication with motor 1406 of the differential lock assembly. Motor 1406 may be an electric motor configured to be selectably energized or de-energized in response to control signals (e.g., electrical pulses) transmitted to the motor 1406 by the control module 1404. Motor 1406 is coupled to cam gear 1412 via transmission 1410, with brake 1408 configured to resist a motion of the motor 1406 and/or transmission 1410. During conditions in which the motor 1406 is not energized, brake 1408 may maintain a position of the cam gear 1412 (e.g., an amount of rotation of the cam gear 1412) by preventing the motor 1406 and/or transmission 1410 from moving (e.g., rotating or driving cam gear 1412). However, force applied by the brake 1408 to the motor 1406 and/or transmission 1410 may be much lower than a driving force of the motor 1406 during conditions in which the motor 1406 is energized, such that the brake does not maintain the position of the motor 1406 or the transmission 1410 during conditions in which the motor 1406 is energized.

Sensor 1414 is adapted to measure a position of the cam gear 1412 (e.g., relative to a housing of the differential lock assembly), and may transmit signals indicating the measured position to the control module 1404. For example, during conditions in which the differential lock assembly is in a locked mode (e.g., locked condition, wherein rotation of half shaft 1432 is locked relative to carrier 1430), sensor 1414 may measure the position of the cam gear 1412, and the control module 1404 may determine that the differential lock assembly is in the locked mode based on the measured position of the cam gear 1412 (e.g., the control module 1404 may determine that the differential lock assembly is in the locked mode during conditions in which the measured position of the cam gear 1412 is equal to or within a pre-determined range, such as a range of 2 millimeters, of a first pre-determined position of the cam gear 1412 stored in non-transitory memory of the control module 1404). The control module 1404 may transmit electrical signals to the controller of the vehicle in order to indicate that the differential lock assembly is in the locked mode. In another example, during conditions in which the differential lock assembly is in an unlocked mode, the control module 1404 may similarly determine that the differential lock assembly is in the unlocked mode based on the measured position of the cam gear 1412 via sensor 1414 (e.g., the control module 1404 may determine that the differential lock assembly is in the unlocked mode during conditions in which the measured position of the cam gear 1412 is equal to or within a pre-determined range, such as a range of 2 millimeters, of a second pre-determined position of the cam gear 1412 stored in non-transitory memory of the control module 1404).

During conditions in which the differential lock assembly is in the locked mode (e.g., locked condition), cam gear 1412 is configured to engage clutch ring 1424 with differential carrier 1430 and axle half shaft 1432 via biasing member 1416 and washers 1420. In some examples, the clutch ring 1424 may engage with the carrier 1430 and half shaft 1432 via one or more internal drive gears (IDGs), such as IDG 1422 and IDG 1426, respectively. In other examples, the clutch ring 1424 may engage directly with the carrier 1430 and half shaft 1432 without the one or more internal drive gears (e.g., with no components positioned between the clutch ring 1424 and the carrier 1430, and/or between the clutch ring 1424 and the half shaft 1432). During conditions in which the differential lock assembly is in the unlocked mode, cam gear 1412 does not engage clutch ring 1424 with the differential carrier 1430 and axle half shaft 1432.

For example, motor 1406 may be energized in response to signals transmitted to the motor 1406 by control module 1404 in order to rotate the cam gear 1412 to a first position via the motor 1406 and transmission 1410, with the rotation of the cam gear 1412 to the first position pressing teeth of the clutch ring 1424 into engagement with counterpart teeth of the half shaft 1432 to lock rotation of the half shaft 1432 relative to the carrier 1430. In order to press the clutch ring 1424 into engagement with the half shaft 1432, the cam gear 1412 may compress biasing member 1416, with biasing member 1416 applying force to washers 1420 to press against the clutch ring 1424. Engagement of the teeth of the clutch ring 1424 with the counterpart teeth of the half shaft 1432 may be referred to herein as the locked mode of the differential lock assembly. While in the locked mode, rotation of half shaft 1432 and wheel 1434 is locked with respect to carrier 1430 and ring gear 1428.

Motor 1406 may additionally be energized in response to signals transmitted to the motor 1406 by the control module 1404 in order to rotate the cam gear 1412 to a second position, wherein the teeth of the clutch ring 1424 are not pressed into engagement with the counterpart teeth of the half shaft 1432. Conditions in which the teeth of the clutch ring 1424 are not pressed into engagement with the counterpart teeth of the half shaft 1432 may be referred to herein as the unlocked mode of the differential lock assembly.

Further examples of operation of similar differential lock assemblies are described below with reference to FIGS. 4-13.

Figure 4:
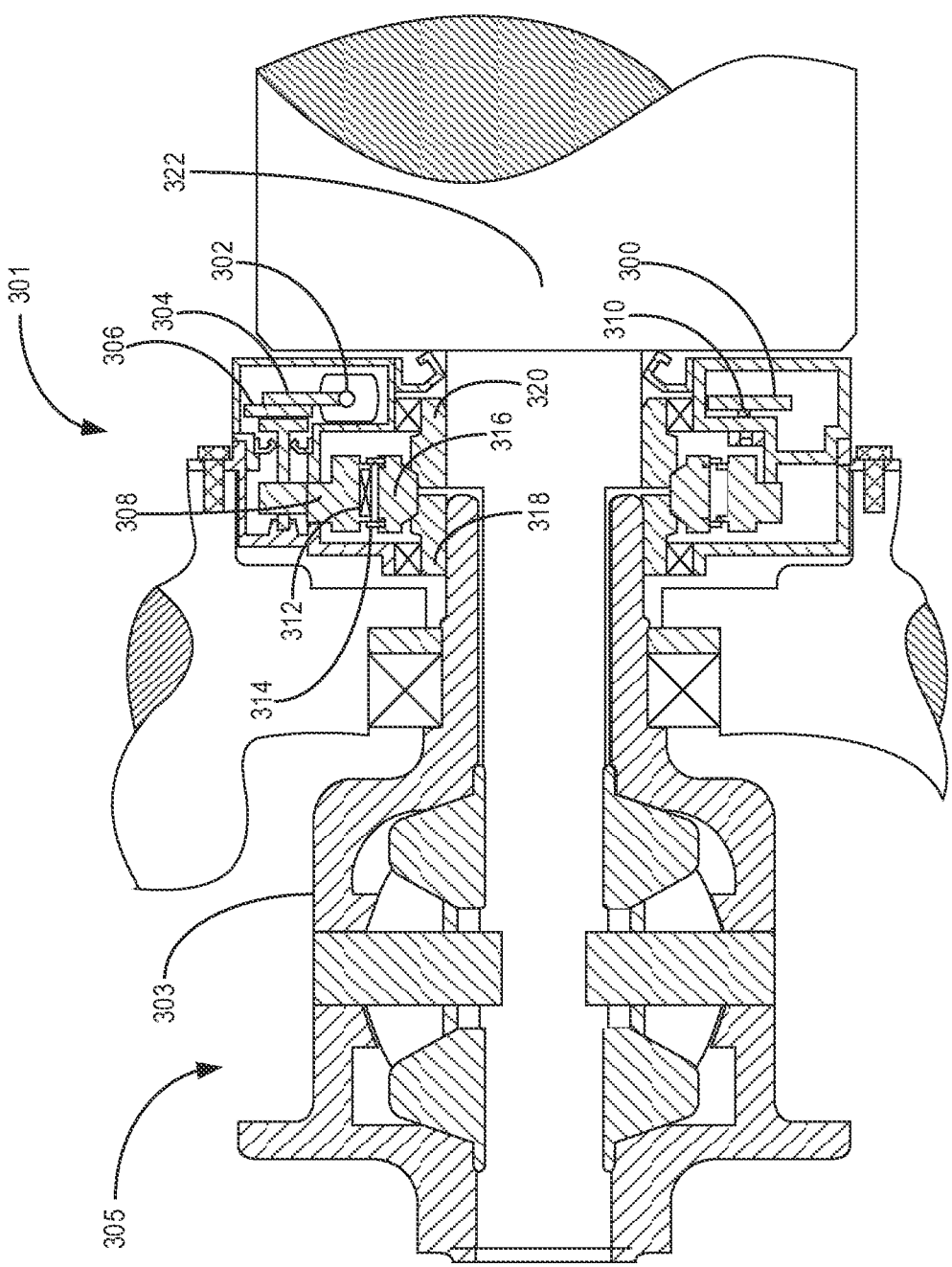
FIG. 4 shows a cross-sectional view of a differential lock assembly of a differential coupled to an axle half shaft of a vehicle.
Figure 5:
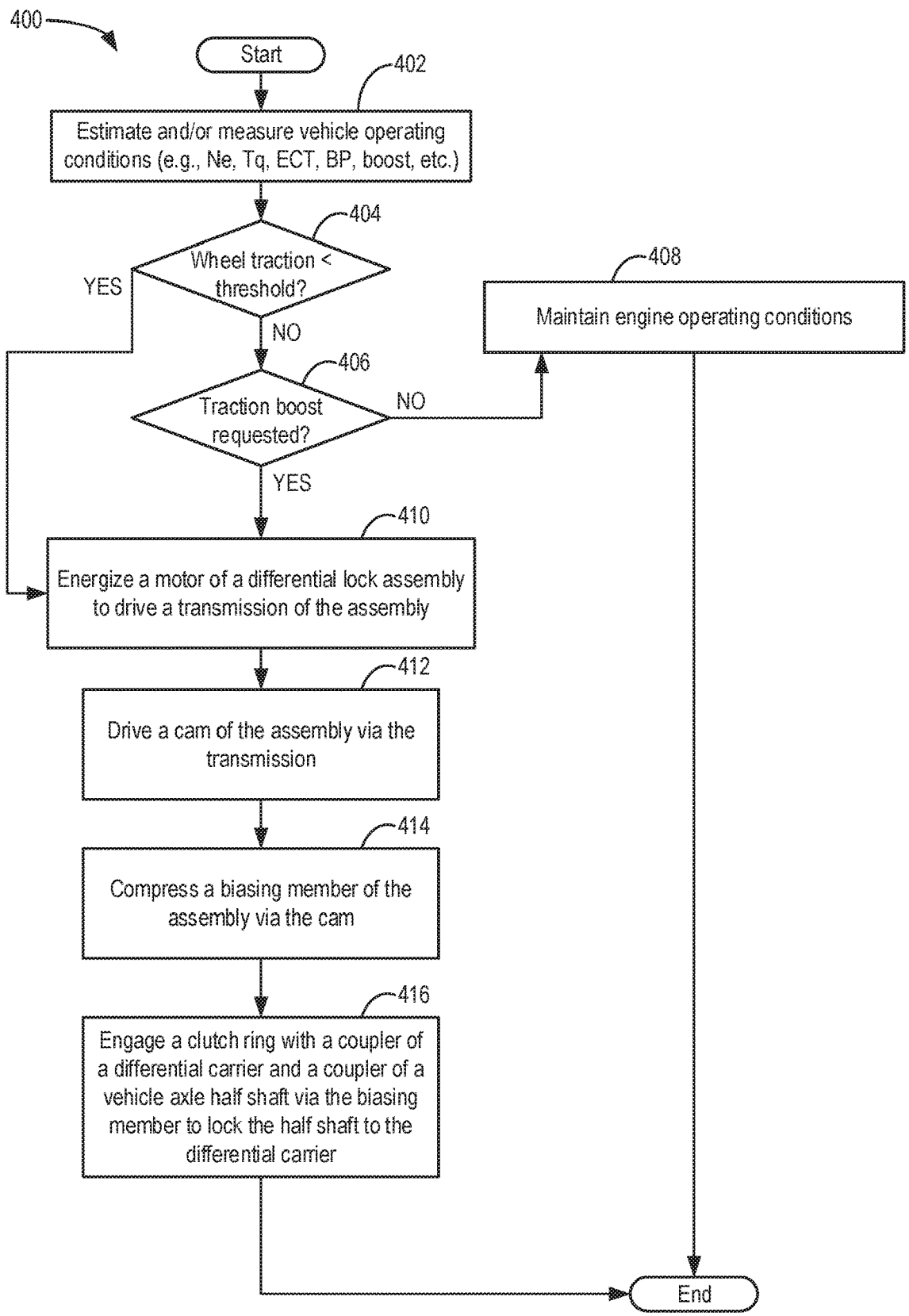
FIG. 5 illustrates a method for locking a differential of a vehicle via a differential lock assembly.

Turning now to FIG. 4, a cross-sectional view of a differential lock assembly 301 (e.g., similar to differential lock assembly 197 described above) coupled to differential 305 is shown. The differential lock assembly 301 may be mounted to a carrier 303 (e.g., casing or housing) of the differential 305. In one example, the differential lock assembly 301 may be bolted to the carrier 303 of the differential 305. In other examples, the differential lock assembly 301 may be coupled to the carrier 303 in a different way (e.g., welded, clamped, etc.). During conditions in which the differential lock assembly 301 is in a locked condition, the differential lock assembly 301 locks a rotation of the carrier 303 with respect to half shaft 322, as described further below.

Differential lock assembly 301 includes control module 300 in electronic communication with a controller of a vehicle (e.g., controller 190 of vehicle system 100 described above). The control module 300 may receive signals (e.g., electrical signals) from the controller in order to adjust operation of the differential lock assembly 301. Additionally, the control module may transmit signals to the controller in order to indicate various operating parameters of the differential lock assembly 301 and/or differential 305 (e.g., whether the differential lock assembly 301 is in a locked condition, unlocked condition, or transitional condition, as described below).

Control module 300 is further in electronic communication with electric motor 302 of the differential lock assembly 301. In one example, control module 300 may receive a signal from the controller to adjust an operating mode of the differential lock assembly 301 (e.g., adjust the differential lock assembly 301 from the unlocked condition to the locked condition). The control module 300 may then transmit signals (e.g., electrical signals) to the electric motor 302 in order to adjust an operating mode of the electric motor 302 (e.g., in order to energize the electric motor 302). In some examples, electric motor 302 may be electrically coupled to a power source of the vehicle (e.g., energy storage device 150 shown by FIGS. 1-2 and described above) and may be energized by the power source in response to signals transmitted to the electric motor 302 by the control module 300.

The electric motor 302 is configured to drive a cam gear 308 of the differential lock assembly 301 via a transmission 306 of the assembly. For example, transmission 306 may include one or more gears coupled (e.g., mechanically coupled) to a shaft (e.g., armature) of the electric motor 302. During conditions in which the electric motor 302 is energized (e.g., in response to signals transmitted to the electric motor 302 by the control module 190), the electric motor 302 may rotate the shaft of the electric motor 302 at a first speed. The shaft may be engaged with the transmission 306 such that the shaft provides an input torque to an input end of the transmission 306. The transmission 306 may then provide an output torque at an output end of the transmission 306. In one example, the output end of the transmission 306 may include an output shaft, and the rotation of the shaft of the electric motor 302 may result in a rotation of the output shaft of the transmission 306. For example, the shaft of the electric motor 302 may be driven at the first speed, and the output shaft may be driven at a lower, second speed due to a gear ratio of the gears included by the transmission 306.

The output shaft of the transmission 306 is coupled to cam gear 308 such that as the electric motor 302 drives the output shaft of the transmission 306 (as described above), the output shaft drives (e.g., rotates) the cam gear 308. In one example, the output shaft drives the cam gear 308 in a same rotational direction as a direction of rotation of half shaft 322. For example, during conditions in which the vehicle is propelled in a forward direction (e.g., with half shaft 322 rotating in a first direction), the cam gear 308 may be driven by the output shaft in the first direction. During conditions in which the vehicle is propelled in a backwards direction opposite to the forward direction (e.g., with half shaft 322 rotating in an opposing, second direction), the cam gear 308 may be driven by the output shaft in the second direction. Control module 300 may receive information (e.g., electrical signals) indicating a direction of travel of the vehicle from the electronic controller of the vehicle (e.g., control system 190). In response, the control module may determine whether to drive the output shaft in the first direction or the second direction based on the direction of travel of the vehicle (e.g., the controller may determine to drive the output shaft in the first direction while the vehicle travels in the forward direction or drive the output shaft in the second direction while the vehicle travels in the backward direction, as one example). Driving the cam gear according to the travel direction of the vehicle may enable the cam gear to be rotated with a decreased amount of force applied by the electric motor, as the force applied by the electric motor may be supplemented in part by the motion of the vehicle, in some examples. During conditions in which the vehicle is not moving, the control module may energize the electric motor 302 in order to drive the cam gear 308 in either of the first direction or second direction.

During conditions in which the electric motor 302 is not energized, a position of cam gear 308 may be maintained by brake 304. For example, brake 304 may maintain a position of one or more of the transmission 306, electric motor 302, and/or cam gear 308 (e.g., lock one or more of the transmission 306, electric motor 302, and/or cam gear 308) in order to prevent the cam gear 308 from rotating (via friction between the brake 304 and transmission 306 as one example). However, during conditions in which the electric motor 302 is energized, the torque applied to the cam gear 308 by the transmission 306 (e.g., via the output shaft of the transmission 306, due to the transmission 306 being driven by the electric motor 302) may overcome a resistive force applied by the brake 304 in order to drive the cam gear 308.

The control module 300 may receive signals (e.g., electrical signals) from a sensor 310 of the differential lock assembly 301, with the signals from sensor 310 indicating a position of the cam gear 308 (e.g., an amount of rotation of the cam gear 308 relative to a reference position, such as a position corresponding to an unlocked condition of the differential lock assembly 301). Further, the control module 300 may transmit signals to the controller (e.g., electronic controller) of the vehicle in order to indicate the position of the cam gear 308 to the controller.

Rotation of the cam gear 308 by the transmission 306 via the electric motor 302 may engage the cam gear 308 with a biasing member 312. In one example, biasing member 312 may be a helical spring, and the cam gear 308 may be rotated against the biasing member 312 in order to press against the biasing member 312 and compress the biasing member 312. Biasing member 312 may be coupled to one or more washers (e.g., washer 314), with the one or more washers being positioned between the biasing member 312 and a clutch ring 316 of the differential lock assembly 301. As the biasing member 312 is compressed by the cam gear 308, the clutch ring 316 is pressed against a first coupler 318 and a second coupler 320 by the one or more washers. The first coupler 318 and second coupler 320 may each include a plurality of teeth, and the first coupler 318 and second coupler 320 may be positioned such that a gap (e.g., a clearance) is formed between the first coupler 318 and second coupler 320. Due to the gap, the teeth of the first coupler 318 do not engage with the teeth of the second coupler 320. However, during conditions in which the clutch ring 316 is pressed against the first coupler 318 and second coupler 320 by the one or more washers coupled to the biasing member 312, teeth of the clutch ring 316 may be positioned in meshing engagement with the teeth of the first coupler 318 and second coupler 320 in order to lock the first coupler 318, second coupler 320, and clutch ring 316 together.

First coupler 318 may be mounted to the carrier 303 of the differential 305, and second coupler 320 may be mounted to half shaft 322 (e.g., similar to first half shaft 112 and second half shaft 122 shown by FIG. 1 and described above). During conditions in which the clutch ring 316 is engaged with the first coupler 318 and second coupler 320 (e.g., the teeth of the clutch ring 316 are in meshing engagement with the teeth of first coupler 318 and second coupler 320), the rotation of the half shaft 322 may be locked relative to a rotation of the carrier 303. Although not shown by FIG. 4, the differential 305 may be further coupled to a second half shaft, with the second half shaft configured to drive a different wheel of the vehicle than the half shaft 322. As a result of locking the rotation of the half shaft 322 relative to the rotation of the carrier 303, the half shaft 322 may be driven at a same rotational speed as the second half shaft, such that each wheel driven by the differential 305 rotates at a same speed. This configuration may be referred to herein as a locked condition or locked mode of the differential 305 and/or differential lock assembly 301.

In order to adjust the differential lock assembly 301 from the locked condition to the unlocked condition, the electric motor 302 may energized in order to rotate the cam gear 308 and to disengage the cam gear 308 from the biasing member 312. As a result, the biasing member 312 may not press the clutch ring 316 into engagement with the first coupler 318 and second coupler 320, unlocking the first coupler 318 and second coupler 320 from each other. The half shaft 322 may then rotate freely relative to the carrier 303. An example operation of the differential lock assembly 301 is further described below with reference to FIG. 5.

FIG. 5 illustrates a method 400 for operating a vehicle including a differential having a differential lock assembly. In one example, the vehicle may be similar to vehicle system 100 described above with reference to FIGS. 1-2, the differential may be similar to differential 199 and/or differential 305 described above with reference to FIG. 1 and FIG. 4, respectively, and the differential lock assembly may be similar to differential lock assembly 197 and/or differential lock assembly 301 described above with reference to FIG. 1 and FIG. 4, respectively. Instructions for carrying out method 400 and the rest of the methods included herein may be executed by a controller (e.g., controller 190 described above with reference to FIGS. 1-2) based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 402, the method includes estimating and/or measuring vehicle operating conditions. In one example, vehicle operating conditions may include engine speed, vehicle speed, torque output, ignition timing, fuel injection amount, differential and/or differential lock assembly operating mode (e.g., whether the differential lock assembly is in the locked condition, unlocked condition, or transitional condition), vehicle weight, traction at each wheel, a grade (e.g., incline or decline) of a ground surface on which the vehicle sits, etc. The vehicle operating conditions may be estimated and/or measured by the controller (e.g., electronic controller) of the vehicle in response to signals transmitted to the controller by sensors of the vehicle and engine (such as the sensors described above with reference to FIGS. 1-2).

The method continues from 402 to 404 where the method includes determining whether wheel traction is less than a threshold wheel traction. In one example, the controller may estimate and/or measure the traction of each wheel of the vehicle based on signals transmitted to the controller from one or more sensors of the vehicle (e.g., engine speed sensor, vehicle speed sensor, etc.) and may compare the estimated and/or measured traction for each wheel to the threshold wheel traction. In one example, the controller may estimate the traction based on a speed (e.g., rotation speed) of each wheel relative to each other wheel. For example, the vehicle may include a plurality of wheel speed sensors (e.g., one sensor for each wheel of the vehicle), and the controller may receive signals (e.g., electrical signals) output by each of the wheel speed sensors. The controller may determine the speed of each wheel based on the signals transmitted to the controller by the corresponding wheel speed sensors (e.g., determine the speed of a first wheel based on signals from a first wheel speed sensor, determine the speed of a second wheel based on signals from a second wheel speed sensor, etc.). For example, the speed of a wheel may be determined based on a calculation using a look-up table stored in non-transitory memory of the controller, with the input being a pulse-width of an output of a wheel speed sensor adapted to measure the speed of the wheel, and with the output being wheel speed. Further, the controller may determine a difference between the determined speed of two or more of the wheels and may estimate and/or measure the traction of each wheel based on the determined wheel speed difference.

As one example, the controller may determine the speed of a first wheel of the vehicle (e.g., first wheel 130 shown by FIG. 1 and described above) based on an output of a first wheel speed sensor adapted to measure the speed of the first wheel, and the controller may determine the speed of a second wheel of the vehicle (e.g., second wheel 131 shown by FIG. 1 and described above) based on an output of a second wheel speed sensor adapted to measure the speed of the second wheel. The controller may determine the difference between the speed of the first wheel and the speed of the second wheel, and may determine (e.g., estimate) the traction for each of the first wheel and second wheel based on the difference. For example, during conditions in which the speed of the first wheel is greater than the speed of the second wheel, the controller may determine that the traction of the second wheel is greater than the traction of the first wheel, and during conditions in which the speed of the second wheel is greater than the speed of the first wheel, the controller may determine that the traction of the first wheel is greater than the traction of the second wheel. In the example in which the speed of the first wheel is greater than the speed of the second wheel, the determined traction of the first wheel may be greater during conditions in which the difference in speed between the first wheel and second wheel is smaller, and the determined traction of the first wheel may be smaller during conditions in which the difference in speed between the first wheel and second wheel is greater (e.g., larger differences in speed between the first wheel and second wheel may correspond to a lower determined traction of the first wheel). The controller may compare the determined traction of each wheel to the threshold wheel traction in order to determine whether the traction of any of the wheels is less than the threshold wheel traction.

As yet another example, the controller may determine whether wheel traction is less than a threshold wheel traction based on an output of one or more wheel speed sensors and engine speed sensors. For example, the controller may determine the wheel speed of one or more wheels based on an output of one or more wheel speed sensors, as described above. The controller may additionally determine a speed of the engine (e.g., rotations per minute) based on an output of one or more engine speed sensors, and may estimate an expected wheel speed corresponding to the determined engine speed (e.g., via a lookup table or function stored in non-transitory memory of the controller, with an input being engine speed and an output being expected wheel speed). The controller may determine the wheel traction of one or more wheels of the vehicle based on a difference between the measured wheel speed and the expected wheel speed, and may compare the determined traction to the threshold wheel traction.

If the wheel traction is not less than the threshold wheel traction at 404, the method continues to 406 where the method includes determining whether a traction boost is requested. In one example, a traction boost may be requested by an operator (e.g., driver) of the vehicle via one or more user input devices (e.g., buttons, touchscreens, etc.). The operator may provide an input at the user input devices in order to indicate to the electronic controller that the traction boost is requested. In one example, the operator may press a button positioned within a cabin of the vehicle in order to indicate that the traction boost is requested.

If the traction boost is not requested at 406, the method continues to 408 where the method includes maintaining vehicle operating conditions. For example, at 408, the controller may maintain a speed of the vehicle, speed of the engine, mode of the differential lock assembly (e.g., whether the differential lock assembly is locked or unlocked), etc.

However, if the traction boost is requested at 406, or if the wheel traction is less than the threshold traction at 404, the method continues to 410 where the method includes energizing a motor of the differential lock assembly to drive a transmission of the differential lock assembly. For example, as described above with reference to FIG. 4, the motor (e.g., electric motor 302) of the differential lock assembly (e.g., differential lock assembly 301) may be energized in response to signals transmitted to a control module (e.g., control module 300) of the differential lock assembly in order to drive the transmission (e.g., transmission 306) of the differential lock assembly. In one example, the controller may determine a control signal to send to the control module of the differential lock assembly, such as a pulse width of the signal being determined based on a desired operating mode of the differential lock assembly. The desired operating mode may be based on the traction boost request at 406 or the wheel traction being less than the threshold traction at 404 as described above, or determined based on other operating conditions such as ambient temperature, weather conditions, etc. The controller may determine the pulse width through a determination that directly takes into account the desired operating mode, such as increasing the pulse width to indicate the desired operating mode. The controller may alternatively determine the pulse width based on a calculation using a look-up table with the input being one or more vehicle operating conditions (e.g., relative wheel speed) and the output being pulse-width.

As another example, the controller may make a logical determination (e.g., regarding the operating mode of the differential lock actuator) based on logic rules that are a function of estimated and/or measured wheel traction. The controller may then generate a control signal that is sent to the control module, with the control module energizing the motor of the differential lock actuator to adjust the operating mode of the differential lock actuator.

In one example, the method may include determining the desired operating mode of the differential lock assembly, and in response thereto energizing the motor of the differential lock assembly to adjust the differential lock assembly to the desired operating mode; and determining vehicle operating conditions (which may be determined separately from the desired operating mode indicated by the operator of the vehicle), and in response thereto adjusting the operating mode of the differential lock assembly. In some examples, determining the vehicle operating conditions occurs while or during adjusting the operating mode of the differential lock assembly, and adjusting the mode of the differential lock assembly occurs while a request (e.g., operator request) for a traction boost is not present and/or while or during the determining of the vehicle operating conditions. Further, instructions stored in memory may include determining the operating mode of the differential lock assembly based on an output from a sensor (e.g., sensor 310) of the differential lock assembly, and in response, adjusting the operating mode by instructions for sending a signal to the motor of the differential lock assembly via the control module. In some examples, the method may include determining whether to perform one or more of each of energizing the motor of the differential lock assembly and adjusting the operating mode of the differential lock assembly based on a determination of whether the traction boost is requested (e.g., at 406) and a determining of whether the wheel traction is less than the threshold traction (e.g., at 404).

The method continues from 410 to 412, where the method includes driving a cam gear of the assembly via the transmission of the assembly. In one example, the cam gear may be similar to the cam gear 308 described above with reference to FIG. 4. As described above, the transmission of the differential lock assembly may be driven by the motor of the assembly in order to rotate the cam gear. During conditions in which the cam gear is not driven (e.g., rotated) by the transmission, the position of the cam gear may be maintained by a brake (e.g., brake 304 described above).

The method continues from 412 to 414 where the method includes compressing a biasing member of the differential lock assembly via the cam gear. In one example, the biasing member may be similar to biasing member 312 shown by FIG. 4 and described above. The cam gear may be rotated by the transmission, and the cam gear may press against the biasing member (e.g., spring) in order to compress the biasing member.

The method continues from 414 to 416 where the method includes engaging a clutch ring of the differential lock assembly with a coupler of a differential carrier and a coupler of a vehicle axle half shaft via the biasing member to lock the half shaft to the differential carrier. In one example, the clutch ring, coupler of the differential carrier, half shaft, coupler of the vehicle axle half shaft, and differential carrier may be similar to the clutch ring 316, first coupler 318, half shaft 322, second coupler 320, and differential carrier 303, respectively, described above with reference to FIG. 4. As described above, the biasing member may press against the clutch ring in order to engage teeth of the clutch ring with teeth of the coupler of the differential carrier and teeth of the coupler of the vehicle axle half shaft. Engaging the clutch ring with the couplers in this configuration (e.g., the locked condition or locked mode of the differential lock assembly) locks a rotation of the half shaft relative to the carrier, such that the half shaft does not rotate relative to the carrier. As a result, as the differential is driven by one or more power sources of the vehicle (e.g., engine 110 and/or motor/generator 178 described above with reference to FIGS. 1-2), each wheel driven by the differential rotates at a same speed, and wheel traction may be increased. The method may further include steps for unlocking the differential lock assembly, for example, by driving the cam gear of the differential lock assembly to adjust a position of the cam gear (e.g., amount of rotation of the cam gear) and enable the biasing member to extend such that the clutch ring is not engaged with either of the couplers (e.g., teeth of the clutch ring are not pressed into meshing engagement with teeth of the couplers).

Figure 6:
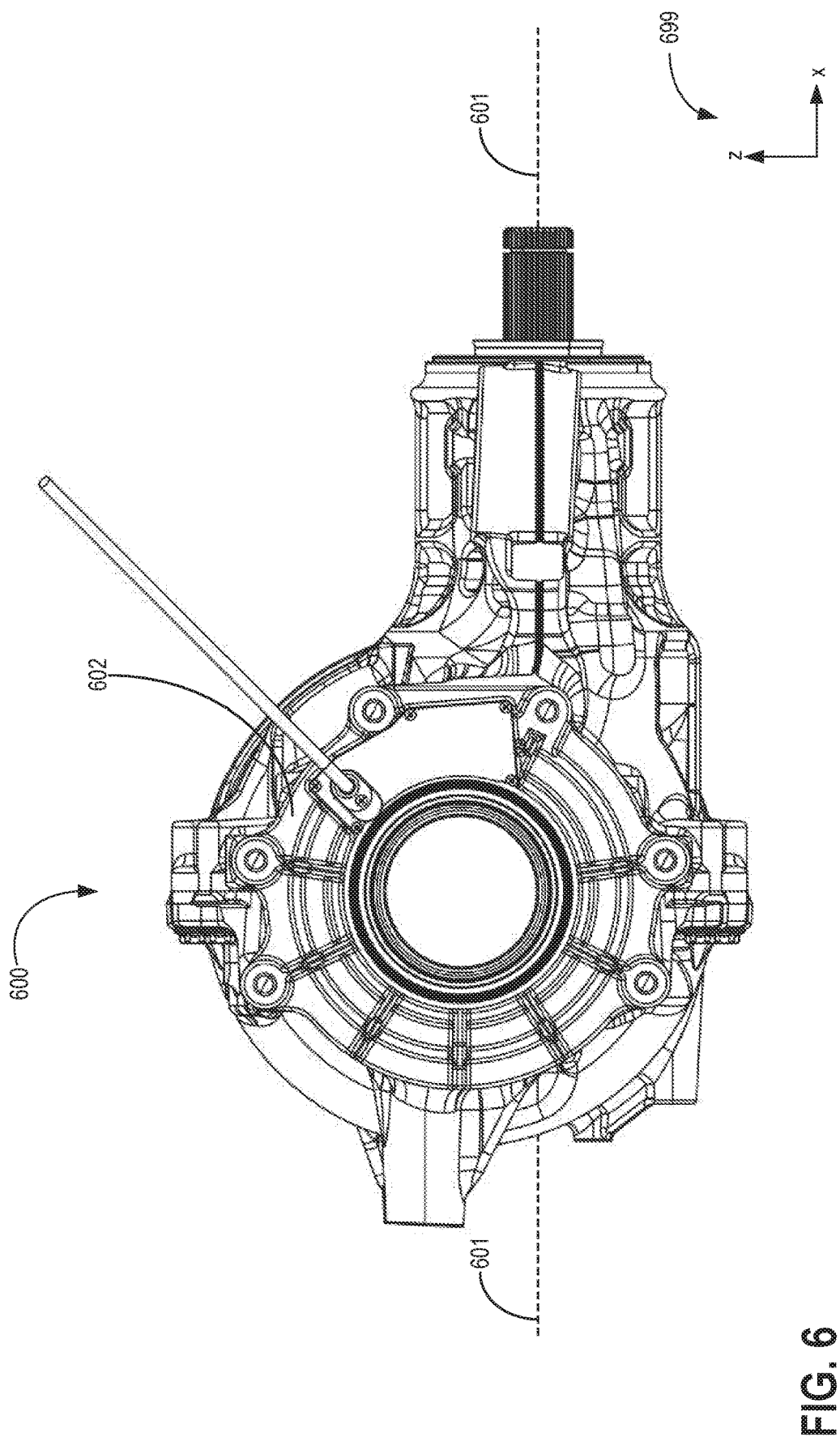
FIG. 6 shows a side view of a differential including a differential lock assembly.

FIG. 6 shows a side view of an example differential 600 including a differential lock assembly 602. In some examples, differential 600 may be similar to differential 199 described above with reference to FIG. 1. Further, differential 600 may be included within a vehicle, such as vehicle system 100 shown by FIG. 1 and described above. In the example show by FIG. 6, the differential lock assembly 602 is a separate unit that may be coupled or decoupled from the differential 600. However, in other examples, one or more of the components of differential lock assembly 602 may be integrated with the differential 600 (e.g., formed together with the differential, fused to the differential, etc.). Reference axes 699 are included by each of FIGS. 6-11B for relative comparison of the views shown. Further, longitudinal axis 601 is included by FIG. 6 for comparison with FIG. 7.

Figure 7:
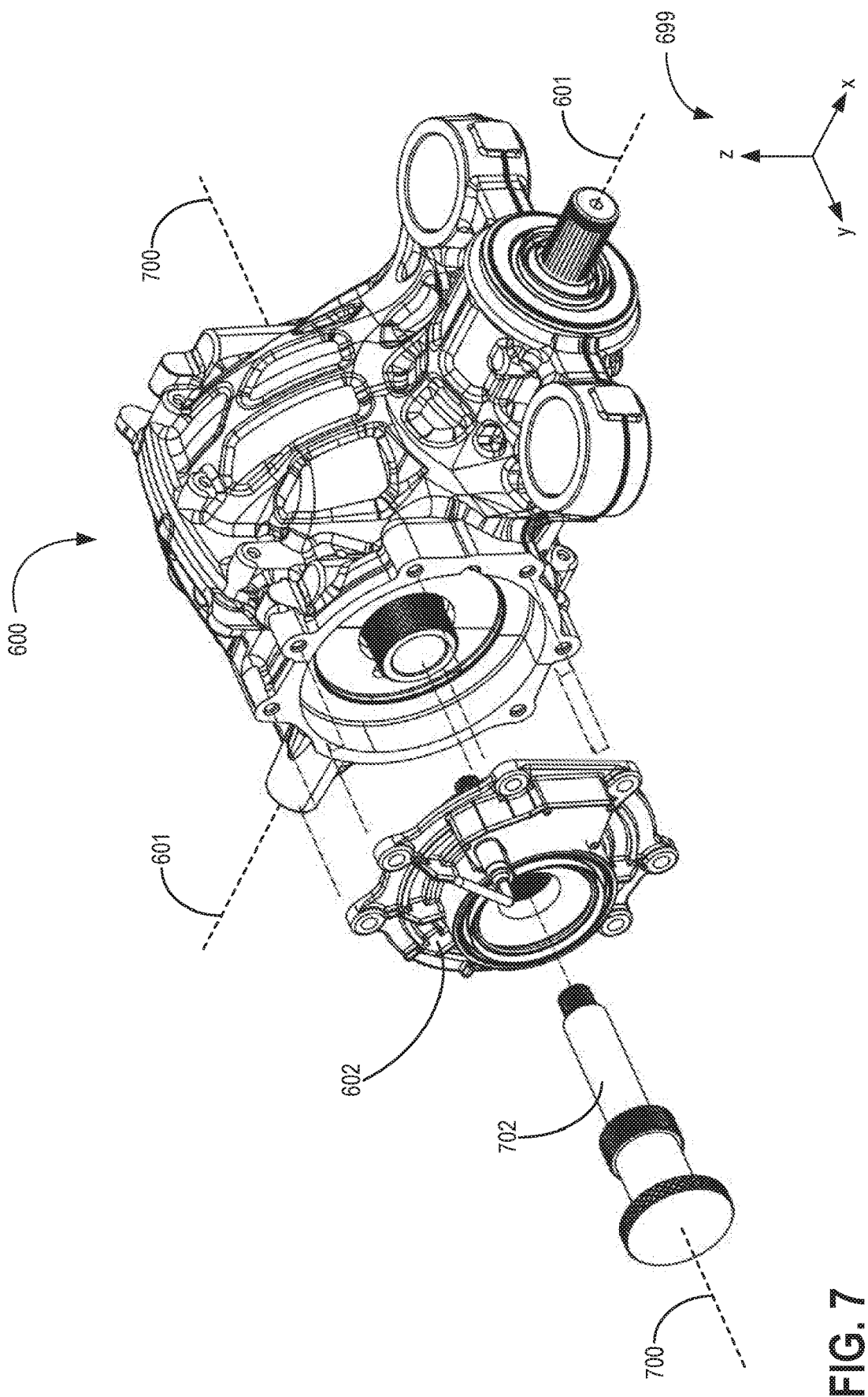
FIG. 7 shows an exploded view of the differential of FIG. 6.
Figure 8:
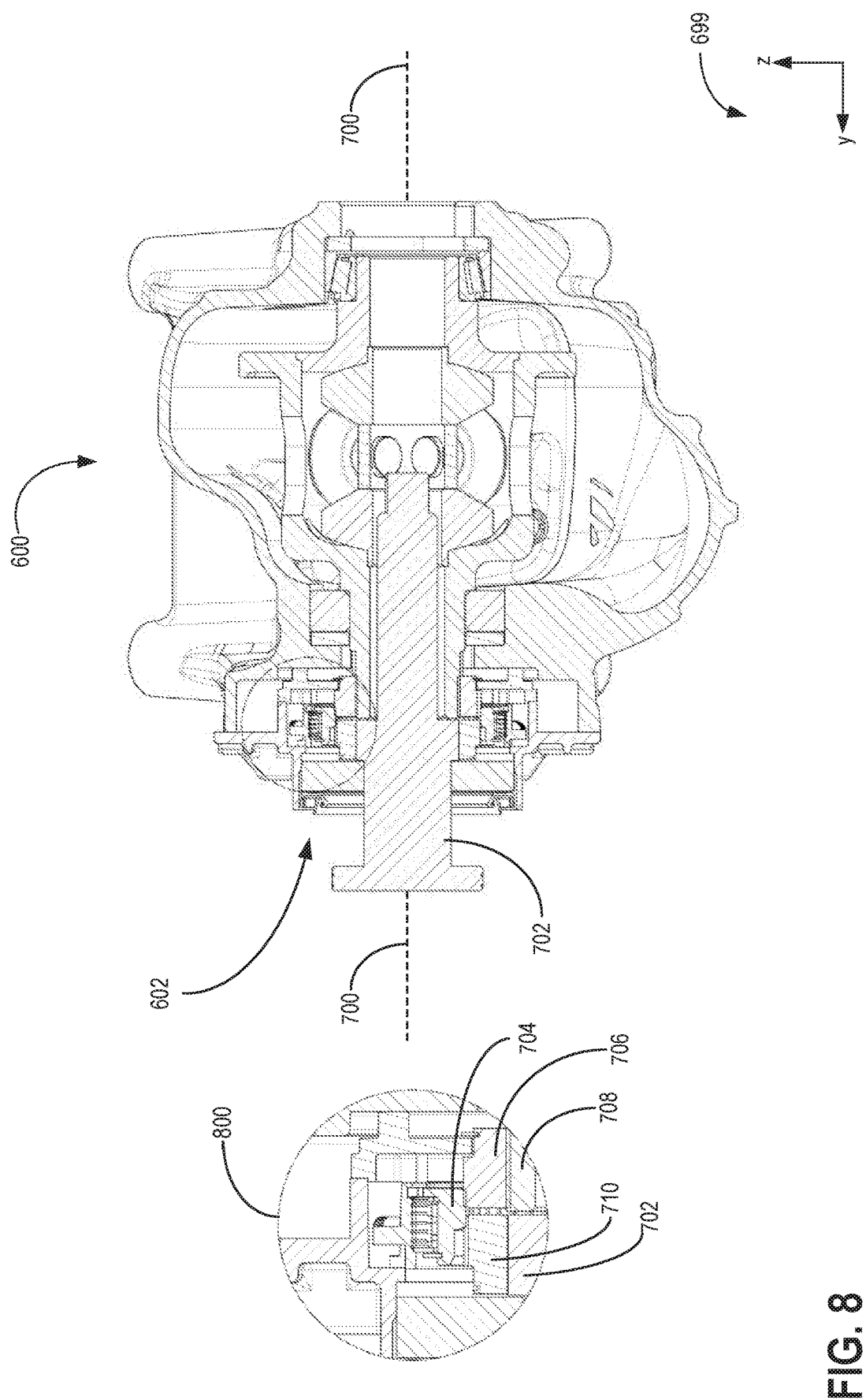
FIG. 8 shows a cross-sectional view of the differential of FIGS. 6-7, with the differential lock assembly in a locked mode.
Figure 9:
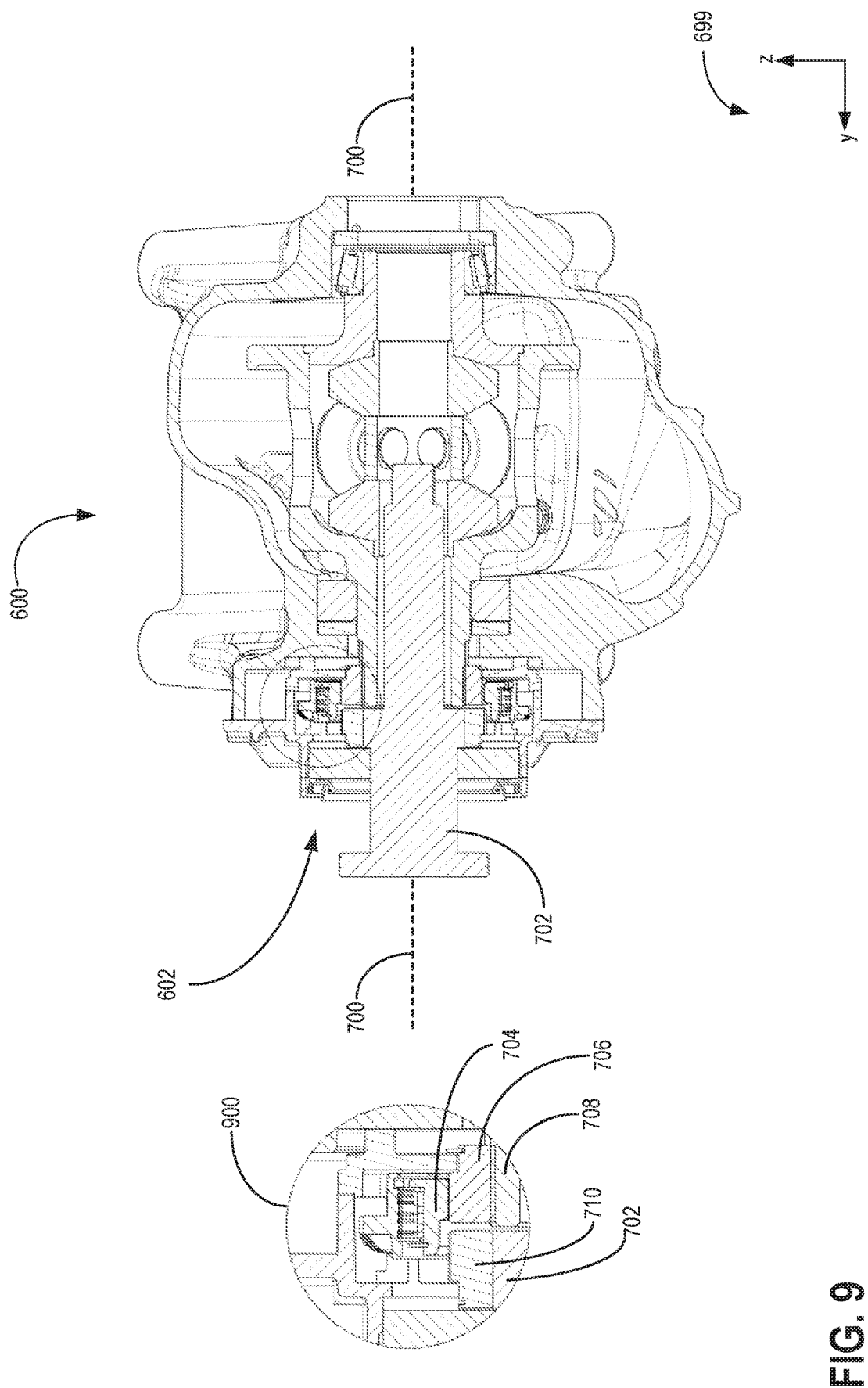
FIG. 9 shows a cross-sectional view of the differential of FIGS. 6-8, with the differential lock assembly in an unlocked mode.
Figure 11B:
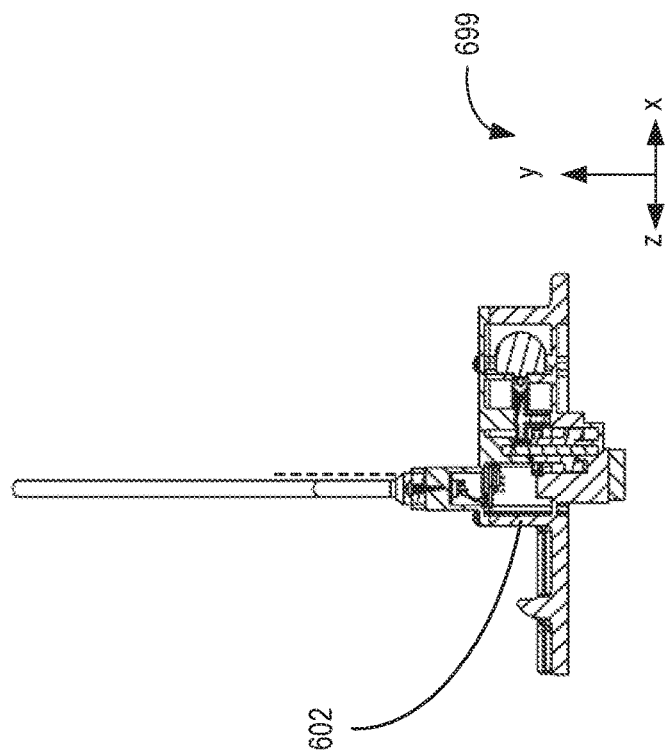
FIGS. 11A-11B show different cross-sectional views of the differential lock assembly of FIGS. 6-10C.
Figure 11A:
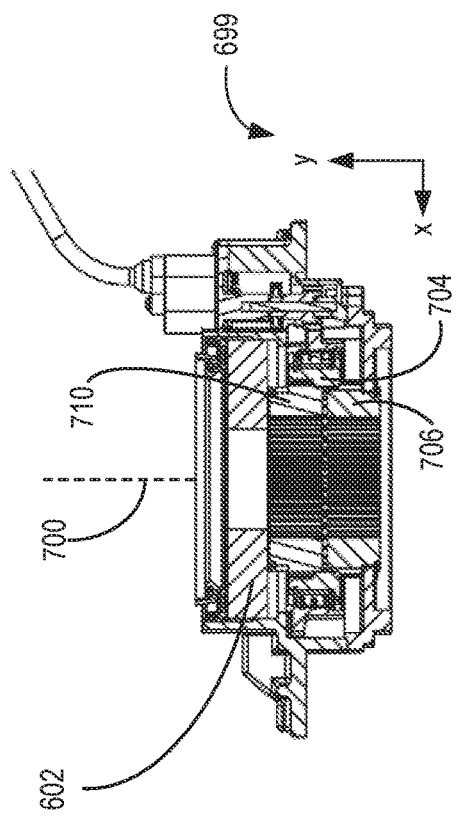

FIG. 7 shows an exploded view of the differential 600. In the view shown by FIG. 7, the differential lock assembly 602 is shown separated from the differential 600. Differential lock assembly 602 may be coupled (e.g., installed) to the differential 600 along axis 700, with axis 700 being an axis of rotation of half shaft 702 (e.g., similar to half shaft 322, half shaft 112, and/or half shaft 122 described above). Differential lock assembly 602 may include several components similar to the other differential lock assemblies described herein, such as clutch ring 704, internal drive gear 706, differential carrier 708, and internal drive gear 710 (e.g., similar to clutch ring 1424, IDG 1422, differential carrier 1430, and IDG 1426, respectively, shown by FIG. 3 and described above). Clutch ring 704, internal drive gear 706, differential carrier 708, and internal drive gear 710 are shown by the enlarged views of inset 800 of FIG. 8 and inset 900 of FIG. 9. As described above with reference to FIG. 3, in some examples, internal drive gears 706 and 710 may not be included, and teeth of the clutch ring 704 may instead engage directly with counterpart teeth of the half shaft 702.

FIGS. 10A-10C show various different views of the differential lock assembly 602 removed from the differential 600. Axis 1000 and axis 1002 are shown by FIG. 10C, with the cross-sectional view shown by FIG. 11A being along axis 1002, and the cross-sectional view shown by FIG. 11B being along axis 1000.

Figure 12:
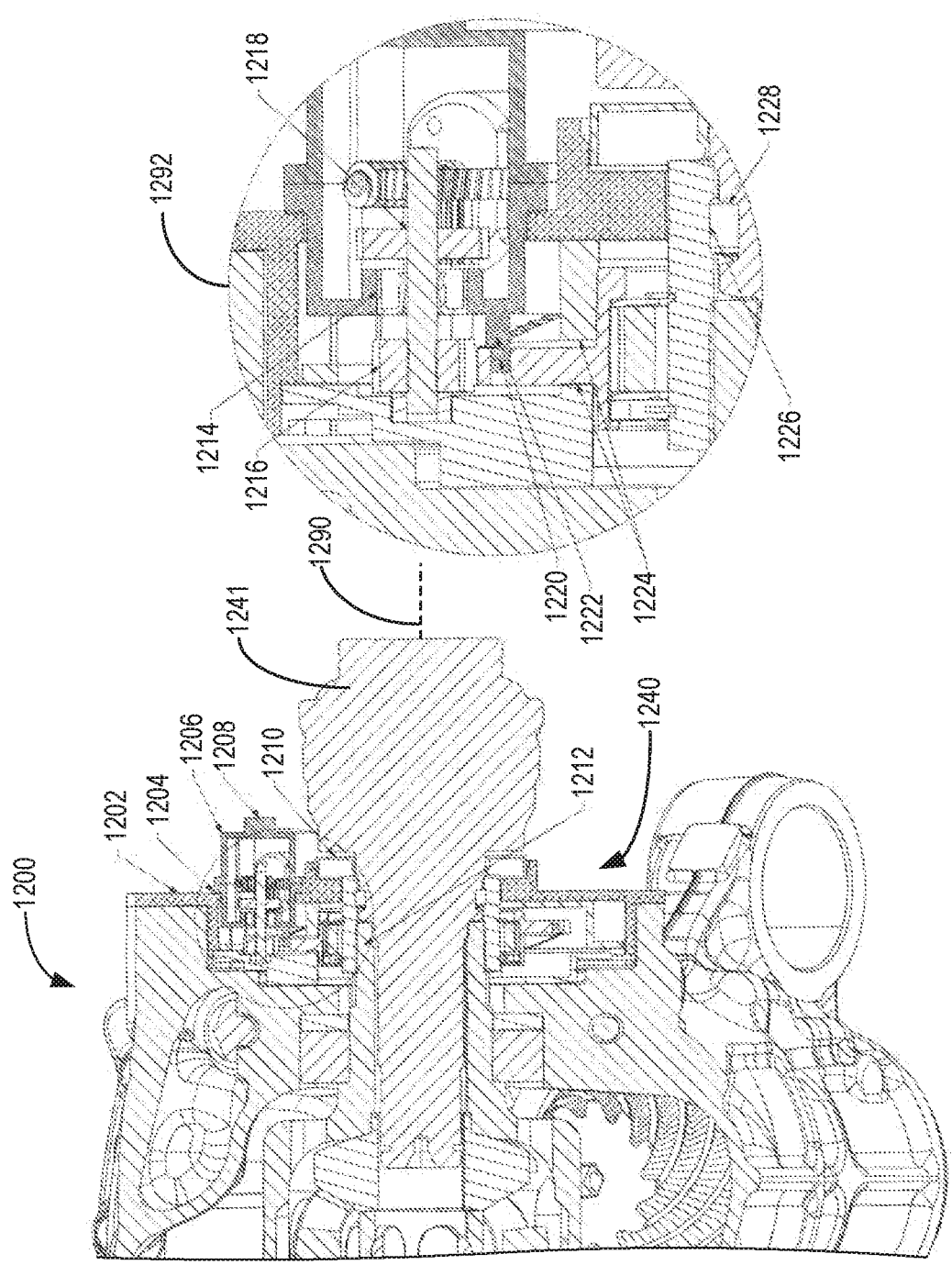
FIG. 12 shows a cross-sectional view of a second differential including a differential lock assembly, with the differential lock assembly in a locked mode.
Figure 13:
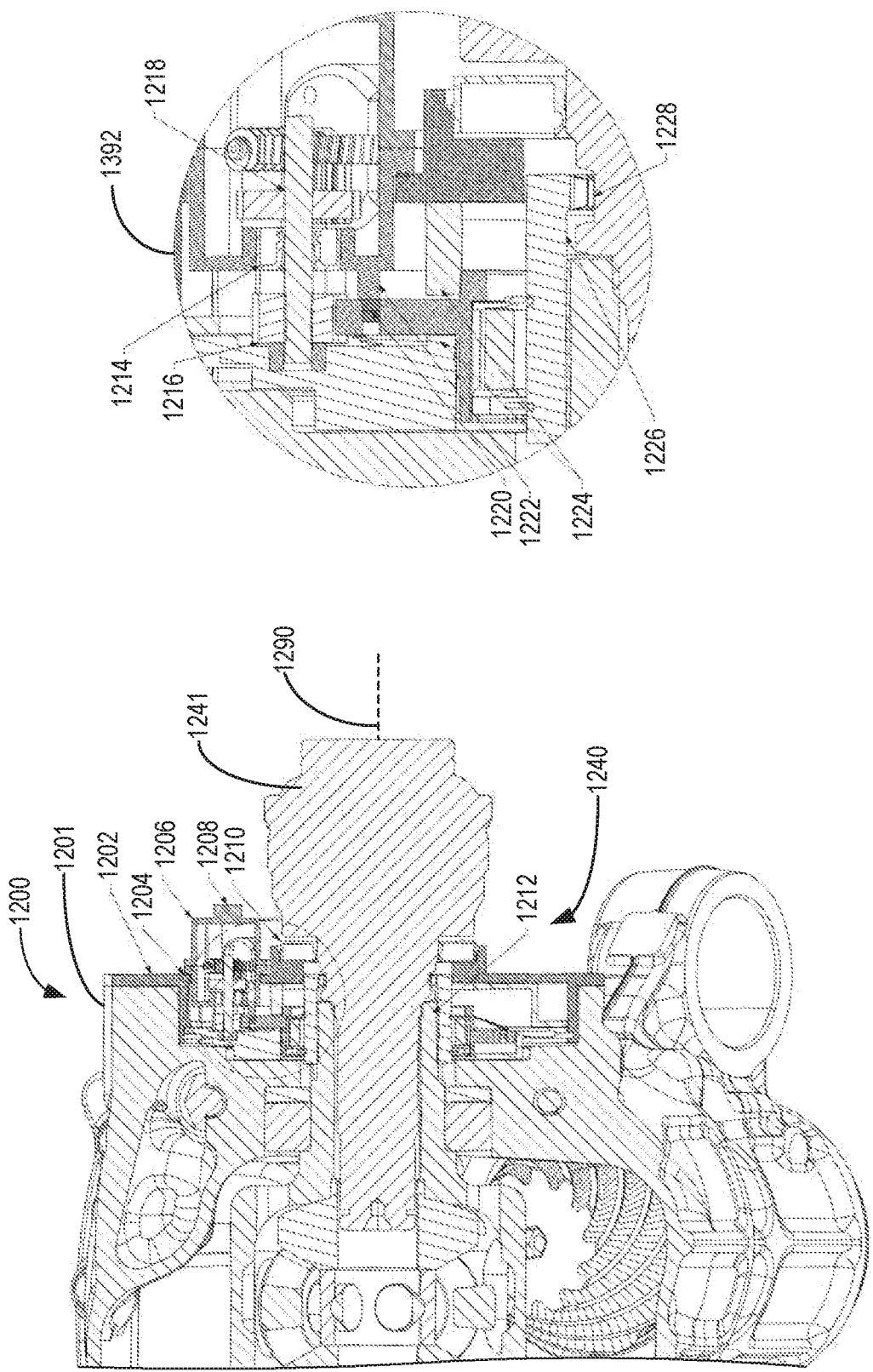
FIG. 13 shows a cross-sectional view of the differential of FIG. 12, with the differential lock assembly in an unlocked mode.

FIGS. 12-13 show another example differential 1200 including a differential lock assembly 1240. FIG. 12 shows the differential lock assembly 1240 in a locked mode (e.g., a mode in which rotation of half shaft 1241 is locked relative to differential carrier 1212, similar to the examples described above), and FIG. 13 shows the differential lock assembly 1240 in an unlocked mode (e.g., a mode in which rotation of half shaft 1241 is not locked relative to differential carrier 1212, similar to the examples described above). Differential 1200 may be included within a vehicle, such as the vehicle system 100 described above with reference to FIG. 1, and half shaft 1241 may be similar to half shaft 322, half shaft 112, and/or half shaft 122 described above). Inset 1292 of FIG. 12 and inset 1392 of FIG. 13 each show enlarged views of the differential lock assembly 1240 of differential 1200 in the locked mode and unlocked mode, respectively.

Differential lock assembly 1240 may be directly coupled to differential 1200 via one or more fasteners (e.g., bolts), in some examples. For example, one or more bolts may be inserted through housing 1202 of the differential lock assembly 1240 in order to secure the differential lock assembly 1240 to a housing 1201 (which may be referred to herein as a casing) of the differential 1200. Differential lock assembly 1240 includes a motor module 1206 configured to house an electric motor (e.g., similar to the motor 1406, motor 302, etc. described above). In the example shown by FIGS. 12-13, motor module 1206 is a separate component relative to the housing 1202 that interfaces with motor module output gear 1216 (which may be referred to herein as a cam drive gear or cam gear) and may be coupled to the housing 1202 (e.g., fastened, fused, etc.). Further, motor module 1206 may include one or more seals (e.g., motor module to housing seal 1204, motor module output seal 1214, etc.) in order to reduce a likelihood of fluids or other matter (e.g., dirt, dust, etc.) from becoming trapped between the motor module 1206 and the housing 1202. Further, additional seals (e.g., half shaft seal 1210) may fluidly seal the interface between the motor module 1206 and the half shaft 1241.

Similar to sensor 1414 and/or sensor 310 described above, differential lock assembly 1240 includes a sensor 1222 having a sensor magnet 1220, with the sensor 1222 configured to detect the position of the cam gear 1216 relative to the housing 1202 and/or differential carrier 1212. In some examples, sensor 1222 may interface (e.g., communicate electronically) with a controller of the vehicle (e.g., controller 190) via motor module connector 1208. For example, one or more wires may be couple motor module connector 1208 to the controller to enable a control module of the differential lock assembly 1240 (e.g., similar to control module 300 described above) to communicate electronically with the controller (e.g., to indicate a mode of the differential lock assembly 1240 to the controller).

Similar to the examples described above, the differential lock assembly 1240 includes a clutch ring 1226 (which may be referred to herein as a dual row clutch ring) including a plurality of teeth shaped to engage with counterpart teeth 1228 (which may be referred to herein as dual row splines) positioned along half shaft 1241. The teeth of the clutch ring 1226 may engage with the counterpart teeth in response to rotation of the clutch ring 1226 by the electric motor of motor module 1206 via transmission 1218, in some examples (e.g., similar to the examples described above, with transmission 1218 being similar to transmission 306). Cam guides 1224 may maintain a position of the cam gear 1216 in an axial direction of the half shaft 1241 (e.g., directions parallel to axis 1290, with axis 1290 being similar to axis 700 shown by FIG. 7 and described above).

By configuring the differential lock assemblies described herein to couple to the differential as described above, a packaging size of the differential lock assemblies may be reduced. For example, by including the motor module as a separate unit that is fastened or coupled to the differential lock assembly, a length of the differential lock assembly in a direction parallel to an axis of rotation of the half shaft configured to engage with the clutch ring of the differential lock assembly may be decreased (e.g., a length along axis 1290). Further, engaging the teeth of the clutch ring with counterpart teeth included by the half shaft may enable the differential lock assembly to lock the rotation of the half shaft relative to the differential carrier without the internal drive gears, which may result in a smaller size of the differential lock assembly due to the reduced number of components. The differential lock assembly may be substantially flat and annular, enabling the differential lock assembly to fit into spaces having a reduced amount of working space. As a result, an overall size of the differential may be decreased.

FIG. 4, FIGS. 6-11B, and FIGS. 12-13 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

In this way, by adjusting the differential lock assembly between the locked condition and the unlocked condition via the clutch ring, cam gear, biasing member, transmission, and electric motor as described above, vehicle handling may be increased. For example, during conditions in which a traction between a ground surface and one or more wheels of the vehicle is reduced (relative to each other wheel), the controller may adjust the differential lock actuator from the unlocked condition (e.g., unlocked mode) to the locked condition (e.g., locked mode) in order to drive opposing wheels of the vehicle at a same rotational speed, and a torque provided by the wheels to propel the vehicle may be increased. Similarly, during conditions in which traction is not reduced, the controller may adjust the differential lock actuator from the locked condition to the unlocked condition in order to increase vehicle handling (e.g., reduce a likelihood of wheel skidding while turning corners, etc.). The technical effect of adjusting the differential lock actuator to the locked condition is to lock a rotation of a first wheel of the vehicle to a carrier of a differential, such that the first wheel is driven at a same rotational speed as an opposing, second wheel coupled to the differential.

In one embodiment, a differential lock assembly comprises: a cam gear configured to engage with a biasing member of the differential lock assembly; and a clutch ring driven by the biasing member, the clutch ring adapted to couple in meshing engagement with a first coupler of a differential carrier and a second coupler of an axle half shaft. In a first example of the assembly, the assembly further comprises an electric motor adapted to drive the cam gear in response to a control signal transmitted to the electric motor by a control module of the differential lock assembly. A second example of the assembly optionally includes the first example, and further includes wherein the electric motor is adapted to drive an input end of a transmission of the differential lock assembly, and an output end of the transmission is adapted to drive the cam gear. A third example of the assembly optionally includes one or both of the first and second examples, and further includes a sensor disposed within the differential lock assembly, the sensor adapted to measure a position of the cam gear, the sensor in electronic communication with the control module. A fourth example of the assembly optionally includes one or more or each of the first through third examples, and further includes wherein the clutch ring includes a plurality of teeth adapted for meshing engagement with a plurality of teeth of the first coupler and a plurality of teeth of the second coupler. A fifth example of the assembly optionally includes one or more or each of the first through fourth examples, and further includes a washer coupled to the biasing member, wherein the washer is adapted to engage with the clutch ring, and wherein the washer locks the biasing member from rotating.

In one embodiment, a method comprises: transitioning a differential lock assembly to a locked condition by engaging a clutch ring of the differential lock assembly with a first coupler of a differential carrier and a second coupler of an axle half shaft. In a first example of the method, the method further includes wherein transitioning the differential lock assembly to the locked condition occurs in response to determining that a traction at one or more wheels of a vehicle including the differential lock assembly is less than a threshold traction. A second example of the method optionally includes the first example, and further include wherein the threshold traction is based on a pre-determined difference in rotational speed of opposing wheels of the vehicle, with one of the opposing wheels coupled to the axle half shaft, and wherein the determined traction at the one or more wheels of the vehicle is based on an output of one or more wheel speed sensors and engine speed sensors. A third example of the method optionally includes one or both of the first and second examples, and further includes wherein transitioning the differential lock assembly to the locked condition includes rotating a cam gear of the differential lock assembly into engagement with a biasing member of the differential lock assembly, the biasing member engaged with the clutch ring. A fourth example of the method optionally includes one or more or each of the first through third examples, and further includes wherein rotating the cam gear of the differential lock assembly includes driving the cam gear via an output end of a transmission of the differential lock assembly, the transmission including an input end driven by an electric motor. A fifth example of the method optionally includes one or more or each of the first through fourth examples, and further includes wherein driving the input end of the transmission via the electric motor includes energizing the electric motor in response to a control signal transmitted to the electric motor by a control module of the differential lock assembly. A sixth example of the method optionally includes one or more or each of the first through fifth examples, and further includes wherein transitioning the differential lock assembly to the locked condition occurs in response to a traction boost request input by an operator of a vehicle including the differential lock assembly via one or more user input devices. A seventh example of the method optionally includes one or more or each of the first through sixth examples, and further includes wherein engaging the clutch ring of the differential lock assembly with the first coupler and second coupler includes engaging teeth of the clutch ring in meshing engagement with teeth of the first coupler and teeth of the second coupler. An eighth example of the method optionally includes one or more or each of the first through seventh examples, and further includes wherein transitioning the differential lock assembly to the locked condition locks a rotation of the axle half shaft relative to the differential carrier.

In one embodiment, a system comprises: a first axle half shaft drivably coupled to a first wheel; a differential coupled to the first axle half shaft; a differential lock assembly mounted to a carrier of the differential, the differential lock assembly configured to lock the carrier to the first axle half shaft via engagement of a clutch ring of the differential lock assembly with a toothed, first coupler of the first axle half shaft and a toothed, second coupler of the carrier. In a first example of the system, the system further includes an electric motor disposed within the differential lock assembly, the electric motor adapted to drive a cam gear of the differential lock assembly against a biasing member to engage the clutch ring with the first coupler and second coupler. A second example of the system optionally includes the first example, and further includes wherein the differential is further coupled to a second axle half shaft having an opposing, second wheel coupled thereto, and wherein the differential is adapted to drive the first wheel via the first axle half shaft and the second wheel via the second axle half shaft. A third example of the system optionally includes one or both of the first and second examples, and further includes wherein the first wheel and second wheel are positioned at one of a front or a back of a vehicle. A fourth example of the system optionally includes one or more or each of the first through third examples, and further includes a second differential having a second differential lock assembly mounted to a second carrier of the second differential, the second differential lock assembly including a second clutch ring adapted to engage with a third coupler of the second carrier and a fourth coupler of a third axle half shaft, the second differential adapted to drive a third wheel via the third axle half shaft and a fourth wheel via a fourth axle half shaft.

In another representation, a system comprises: a first axle half shaft drivably coupled to a first wheel; a differential coupled to the first axle half shaft, the differential adapted to be driven by an electric machine of a vehicle; a differential lock assembly mounted to a carrier of the differential, the differential lock assembly configured to lock the carrier to the first axle half shaft via engagement of a clutch ring of the differential lock assembly with a toothed, first coupler of the first axle half shaft and a toothed, second coupler of the carrier.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A differential lock assembly, comprising:
   a cam gear contacting a first end of a spring and compressing the spring;
   a second end of the spring driving a clutch ring to couple in meshing engagement with a first coupler of a differential carrier and a second coupler of an axle half shaft; and
   a washer coupled to the spring, the washer adapted to engage with the clutch ring and lock the spring from rotating.

2. The differential lock assembly of claim 1, further comprising an electric motor adapted to drive the cam gear in response to a control signal transmitted to the electric motor by a control module of the differential lock assembly.

3. The differential lock assembly of claim 2, wherein the electric motor is adapted to drive an input end of a transmission of the differential lock assembly, and an output end of the transmission is adapted to drive the cam gear.

4. The differential lock assembly of claim 2, further comprising a sensor disposed within the differential lock assembly, the sensor adapted to measure a position of the cam gear, the sensor in electronic communication with the control module.

5. The differential lock assembly of claim 1, wherein the clutch ring includes a first plurality of teeth adapted for meshing engagement with a second plurality of teeth of the first coupler and a third plurality of teeth of the second coupler, and the clutch ring is positioned at a gap between the first coupler and second coupler; and
   wherein the spring is a helical spring which pressed the clutch ring into the gap when compressed.

6. A method, comprising:
   transitioning a differential lock assembly to a locked condition by compressing a spring to drive a clutch ring of the differential lock assembly radially inward relative to an axle half shaft to engage with a first coupler of a differential carrier and a second coupler of the axle half shaft.

7. The method of claim 6, wherein transitioning the differential lock assembly to the locked condition occurs in response to determining that a traction at one or more wheels of a vehicle including the differential lock assembly is less than a threshold traction.

8. The method of claim 7, wherein the threshold traction is based on a pre-determined difference in rotational speed of opposing wheels of the vehicle, with one of the opposing wheels coupled to the axle half shaft, and wherein the determined traction at the one or more wheels of the vehicle is based on an output of one or more wheel speed sensors and engine speed sensors.

9. The method of claim 6, wherein transitioning the differential lock assembly to the locked condition includes rotating a cam gear of the differential lock assembly into engagement with the spring of the differential lock assembly, the spring engaged with the clutch ring.

10. The method of claim 9, wherein rotating the cam gear of the differential lock assembly includes driving the cam gear via an output end of a transmission of the differential lock assembly, the transmission including an input end driven by an electric motor.

11. The method of claim 10, wherein driving the input end of the transmission via the electric motor includes energizing the electric motor in response to a control signal transmitted to the electric motor by a control module of the differential lock assembly.

12. The method of claim 6, wherein transitioning the differential lock assembly to the locked condition occurs in response to a traction boost request input via one or more user input devices.

13. The method of claim 6, wherein engaging the clutch ring of the differential lock assembly with the first coupler and second coupler includes engaging teeth of the clutch ring in meshing engagement with teeth of the first coupler and teeth of the second coupler.

14. The method of claim 6, wherein transitioning the differential lock assembly to the locked condition locks a rotation of the axle half shaft relative to the differential carrier.

15. A system, comprising:
   a first axle half shaft drivably coupled to a first wheel;
   a differential coupled to the first axle half shaft; and
   a differential lock assembly mounted to a carrier of the differential, the differential lock assembly configured to lock the carrier to the first axle half shaft via engagement of a clutch ring of the differential lock assembly with a toothed, first coupler of the carrier and a toothed, second coupler of the first axle half shaft, the differential lock assembly comprising:
      a cam gear with a first position compressing a spring, and the spring compressed against the clutch ring to engage the clutch ring with the first coupler and second coupler, and
      a second position of the cam gear where the spring does not compress the clutch ring and the first coupler and second coupler are unlocked from each other.

16. The system of claim 15, further comprising an electric motor disposed within the differential lock assembly, the electric motor adapted to drive the cam gear.

17. The system of claim 15, wherein the differential is further coupled to a second axle half shaft having an opposing, second wheel coupled thereto, and wherein the differential is adapted to drive the first wheel via the first axle half shaft and the second wheel via the second axle half shaft.

18. The system of claim 17, wherein the first wheel and second wheel are positioned at one of a front or a back of a vehicle.

19. The system of claim 18, further comprising a second differential having a second differential lock assembly mounted to a second carrier of the second differential, the second differential lock assembly including a second clutch ring adapted to engage with a third coupler of the second carrier and a fourth coupler of a third axle half shaft, the second differential adapted to drive a third wheel via the third axle half shaft and a fourth wheel via a fourth axle half shaft.

* * * * *